(12) United States Patent
Wydeven et al.

(10) Patent No.: US 7,931,725 B2
(45) Date of Patent: Apr. 26, 2011

(54) FLUTED FILTER APPARATUS

(75) Inventors: Robert M. Wydeven, Eagan, MN (US); Gene W. Brown, Franklin, TN (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 12/633,338

(22) Filed: Dec. 8, 2009

(65) Prior Publication Data
US 2010/0192530 A1 Aug. 5, 2010

Related U.S. Application Data

(63) Continuation-in-part of application No. 11/355,064, filed on Feb. 15, 2006, now abandoned, and a continuation-in-part of application No. 10/979,867, filed on Nov. 2, 2004, now abandoned.

(51) Int. Cl.
*B01D 39/00* (2006.01)
(52) U.S. Cl. ............... 55/498; 55/495; 55/497; 55/500; 55/502; 55/503; 55/385.3; 55/520; 55/521; 55/528; 55/527; 123/198 E
(58) Field of Classification Search .................... 55/495, 55/497, 498, 500, 502, 503, 385.3, 520, 521, 55/528, 527; 123/198 E
See application file for complete search history.

(56) References Cited

U.S. PATENT DOCUMENTS

| | | |
|---|---|---|
| 1,943,080 A | 1/1934 | Langston |
| 1,947,066 A | 2/1934 | Sieg |
| 1,954,881 A | 4/1934 | List |
| 3,025,963 A | 3/1962 | Bauer |
| 3,255,889 A | 6/1966 | Goldman et al. |
| 3,397,518 A | 8/1968 | Rogers |
| 3,438,588 A | 4/1969 | Steinholtz et al. |
| 3,676,247 A | 7/1972 | Morris et al. |
| 3,679,057 A | 7/1972 | Perez |
| 4,252,591 A | 2/1981 | Rosenberg |
| 4,253,228 A | 3/1981 | Easley |
| 4,257,790 A | 3/1981 | Bergquist et al. |
| 4,428,758 A | 1/1984 | Montierth |

(Continued)

FOREIGN PATENT DOCUMENTS

JP S60-112320 7/1985

(Continued)

OTHER PUBLICATIONS

U.S. Appl. No. 10/979,401, filed Nov. 2, 2004, Brown.

(Continued)

*Primary Examiner* — Jason M Greene
*Assistant Examiner* — Dung Bui
(74) *Attorney, Agent, or Firm* — Reinhart Boerner Van Deuren P.C.

(57) ABSTRACT

A filter element and filter apparatus, and a method for fabricating a filter element, include a filter element having alternating layers of a face sheet material and a convoluted filter material, with the alternating layers forming substantially longitudinally oriented flutes that extend axially along, or past, a radially acting seal, into previously unused portions of the cavity of a filter housing. In some embodiments, structures such as struts extending partially across an outlet end of the filter element, or a rigid web formed by a layer of resin extending axially a potted length into pome of the flutes from the outlet end resist axially oriented pressure forces on the alternating layers.

22 Claims, 19 Drawing Sheets

U.S. PATENT DOCUMENTS

| | | | |
|---|---|---|---|
| 4,498,989 A | 2/1985 | Miyakawa et al. |
| 4,579,698 A | 4/1986 | Meyering et al. |
| 4,589,983 A | 5/1986 | Wydevan |
| 4,720,292 A | 1/1988 | Engel et al. |
| 4,747,944 A | 5/1988 | George |
| 4,798,575 A | 1/1989 | Siversson |
| 4,838,905 A | 6/1989 | Billiet et al. |
| 4,970,004 A | 11/1990 | Rosaen |
| 4,976,677 A | 12/1990 | Siversson |
| 4,976,857 A | 12/1990 | Solomon |
| 5,213,275 A | 5/1993 | Giesy |
| 5,238,474 A | 8/1993 | Kahlbaugh et al. |
| 5,245,897 A | 9/1993 | Arnold et al. |
| 5,338,325 A | 8/1994 | Stanelle |
| 5,346,675 A | 9/1994 | Usui et al. |
| 5,374,006 A | 12/1994 | Mheidle |
| 5,389,175 A | 2/1995 | Wenz |
| 5,435,870 A | 7/1995 | Takagaki et al. |
| 5,484,466 A | 1/1996 | Brown et al. |
| 5,543,007 A | 8/1996 | Takagaki et al. |
| 5,560,824 A | 10/1996 | Sann et al. |
| 5,588,945 A | 12/1996 | Lauderbaugh |
| 5,609,711 A | 3/1997 | Miller |
| 5,686,985 A | 11/1997 | Hayashi |
| 5,720,790 A | 2/1998 | Kometani et al. |
| 5,755,843 A | 5/1998 | Sundquist |
| 5,772,883 A | 6/1998 | Rothman et al. |
| 5,798,247 A | 8/1998 | Albrecht et al. |
| 5,820,646 A | 10/1998 | Gillingham et al. |
| 5,895,574 A | 4/1999 | Friedmann et al. |
| 5,902,364 A | 5/1999 | Tokar et al. |
| 6,022,305 A | 2/2000 | Choi et al. |
| 6,048,386 A | 4/2000 | Gillingham et al. |
| 6,126,833 A | 10/2000 | Stobbe et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar |
| 6,221,122 B1 | 4/2001 | Gieseke |
| 6,235,195 B1 | 5/2001 | Tokar |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,402,798 B1 | 6/2002 | Kallsen et al. |
| 6,405,875 B1 | 6/2002 | Cutler |
| D460,169 S | 7/2002 | Anderson et al. |
| D461,003 S | 7/2002 | Gieseke et al. |
| 6,416,605 B1 | 7/2002 | Golden |
| D461,884 S | 8/2002 | Gieseke et al. |
| 6,436,162 B1 | 8/2002 | Wake et al. |
| 6,447,567 B1 | 9/2002 | Ehrenberg |
| D466,602 S | 12/2002 | Gieseke et al. |
| 6,511,599 B2 | 1/2003 | Jaroszyk et al. |
| 6,517,598 B2 * | 2/2003 | Anderson et al. ............... 55/498 |
| 6,533,845 B2 | 3/2003 | Tokar et al. |
| D473,637 S | 4/2003 | Golden |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay |
| D483,459 S | 12/2003 | DeWit et al. |
| D484,584 S | 12/2003 | Anderson et al. |
| 6,673,136 B2 | 1/2004 | Gillingham et al. |
| 6,703,675 B1 | 3/2004 | Rodgers |
| 6,706,087 B1 | 3/2004 | Gebler et al. |
| 6,743,317 B2 | 6/2004 | Wydeven |
| 6,746,518 B2 | 6/2004 | Gieseke et al. |
| 6,783,565 B2 | 8/2004 | Gieseke et al. |
| 6,851,569 B2 | 2/2005 | Conti et al. |
| 6,852,141 B2 | 2/2005 | Bishop et al. |
| 6,878,190 B1 | 4/2005 | Xu et al. |
| 6,887,343 B2 | 5/2005 | Schukar et al. |
| 6,893,561 B2 | 5/2005 | Jainek |
| D506,539 S | 6/2005 | Bishop et al. |
| 6,946,012 B1 | 9/2005 | Miller et al. |
| 6,959,819 B2 | 11/2005 | Moscaritolo et al. |
| 6,960,245 B2 | 11/2005 | Tokar et al. |
| 6,966,940 B2 | 11/2005 | Krisko et al. |
| 6,974,490 B2 | 12/2005 | Gillingham et al. |
| 6,994,744 B2 | 2/2006 | Tokar et al. |
| 6,997,968 B2 | 2/2006 | Xu et al. |
| 7,001,450 B2 | 2/2006 | Gieseke et al. |
| 7,008,465 B2 | 3/2006 | Graham et al. |
| 7,008,467 B2 | 3/2006 | Krisko et al. |
| 7,090,712 B2 | 8/2006 | Gillingham et al. |
| 7,168,573 B2 | 1/2007 | Brown et al. |
| 7,179,317 B2 | 2/2007 | Chung et al. |
| 7,211,124 B2 | 5/2007 | Gieseke et al. |
| 7,252,704 B2 | 8/2007 | Tokar et al. |
| 7,255,300 B2 | 8/2007 | Johnston |
| 7,261,756 B2 * | 8/2007 | Merritt ............................ 55/482 |
| 7,270,692 B2 | 9/2007 | Gillingham et al. |
| 7,282,075 B2 | 10/2007 | Sporre et al. |
| 7,303,604 B2 | 12/2007 | Gieseke et al. |
| 7,316,723 B2 | 1/2008 | Chung et al. |
| 7,318,851 B2 | 1/2008 | Brown et al. |
| 7,318,852 B2 | 1/2008 | Chung et al. |
| 7,323,029 B2 | 1/2008 | Engelland et al. |
| 7,329,326 B2 | 2/2008 | Wagner et al. |
| 7,338,544 B2 | 3/2008 | Sporre et al. |
| 7,351,270 B2 | 4/2008 | Engelland et al. |
| 7,393,375 B2 | 7/2008 | Xu et al. |
| 7,396,375 B2 | 7/2008 | Nepsund et al. |
| 7,396,376 B2 | 7/2008 | Schrage et al. |
| 2002/0100262 A1 | 8/2002 | Gieseke et al. |
| 2002/0184864 A1 | 12/2002 | Bishop et al. |
| 2002/0185008 A1 | 12/2002 | Anderson et al. |
| 2003/0089654 A1 | 5/2003 | Jainek |
| 2003/0121845 A1 | 7/2003 | Wagner et al. |
| 2003/0146149 A1 | 8/2003 | Binder et al. |
| 2003/0182909 A1 * | 10/2003 | Gieseke et al. ............. 55/385.3 |
| 2003/0217534 A1 | 11/2003 | Krisko et al. |
| 2003/0226800 A1 | 12/2003 | Brown et al. |
| 2004/0071940 A1 | 4/2004 | Frey |
| 2004/0118771 A1 | 6/2004 | Schukar et al. |
| 2004/0194441 A1 * | 10/2004 | Kirsch ............................ 55/497 |
| 2005/0029184 A1 | 2/2005 | Desmarais |
| 2005/0229561 A1 | 10/2005 | Nepsund et al. |
| 2005/0252182 A1 | 11/2005 | Golden et al. |
| 2006/0091061 A1 | 5/2006 | Brown |
| 2006/0091064 A1 * | 5/2006 | Brown et al. .................. 210/450 |
| 2006/0091066 A1 | 5/2006 | Driml et al. |
| 2006/0091084 A1 | 5/2006 | Merritt et al. |
| 2006/0101795 A1 | 5/2006 | Krisko et al. |
| 2006/0151655 A1 | 7/2006 | Johnston |
| 2006/0163150 A1 | 7/2006 | Golden et al. |
| 2007/0039296 A1 | 2/2007 | Schrage et al. |
| 2007/0175194 A1 | 8/2007 | Nepsund et al. |
| 2007/0186528 A1 | 8/2007 | Wydeven et al. |
| 2007/0193236 A1 | 8/2007 | Merritt |
| 2007/0199285 A1 | 8/2007 | Gieseke et al. |
| 2007/0234903 A1 | 10/2007 | Xu et al. |
| 2007/0261374 A1 | 11/2007 | Nelson et al. |
| 2007/0289265 A1 | 12/2007 | Coulonvaux et al. |
| 2008/0010959 A1 | 1/2008 | Gillingham et al. |
| 2008/0016832 A1 | 1/2008 | Krisko et al. |
| 2008/0022641 A1 | 1/2008 | Engelland et al. |
| 2008/0066434 A1 | 3/2008 | Kuempel et al. |
| 2008/0086990 A1 | 4/2008 | Kuempel et al. |
| 2008/0110142 A1 | 5/2008 | Nelson et al. |
| 2008/0110822 A1 | 5/2008 | Chung et al. |
| 2008/0115470 A1 | 5/2008 | Kuempel et al. |
| 2008/0115758 A1 | 5/2008 | Engelland et al. |
| 2008/0135470 A1 | 6/2008 | Merritt et al. |
| 2008/0209874 A1 | 9/2008 | Gieseke et al. |
| 2008/0216654 A1 | 9/2008 | Wagner et al. |
| 2008/0250763 A1 | 10/2008 | Widerski et al. |
| 2008/0250766 A1 | 10/2008 | Schrage et al. |

FOREIGN PATENT DOCUMENTS

| | | |
|---|---|---|
| JP | S60-124622 | 8/1985 |
| JP | 63-122617 | 6/1988 |
| JP | HEI 2-31131 | 8/1990 |

| | | |
|---|---|---|
| WO | WO 2005/058461 A1 | 6/2005 |
| WO | WO 2005/077487 A1 | 8/2005 |
| WO | WO 2005/082484 A1 | 9/2005 |
| WO | WO 2005/123222 A1 | 12/2005 |
| WO | WO 2006/014941 A2 | 2/2006 |
| WO | WO 2006/017790 A1 | 2/2006 |
| WO | WO 2006/076456 A1 | 7/2006 |
| WO | WO 2006/076479 A1 | 7/2006 |
| WO | WO 2006/093960 A2 | 9/2006 |
| WO | WO 2007/009039 A1 | 1/2007 |
| WO | WO 2007/044677 A1 | 4/2007 |
| WO | WO 2007/056589 A2 | 5/2007 |
| WO | WO 2007/145939 A2 | 12/2007 |
| WO | WO 2008/045325 A2 | 4/2008 |
| WO | WO 2008/095196 A1 | 8/2008 |
| WO | WO 2008/098185 A1 | 8/2008 |
| WO | WO 2008/106375 A2 | 9/2008 |

OTHER PUBLICATIONS

U.S. Appl. No. 10/979,867, filed Nov. 2, 2004, Brown et al.
U.S. Appl. No. 10/979,987, filed Nov. 3, 2004, Johnston.
U.S. Appl. No. 10/979,876, filed Nov. 2, 2004, Brown et al.
U.S. Appl. No. 11/355,064, filed Feb. 15, 2006, Wydeven et al.
U.S. Appl. No. 11/357,788, filed Feb. 17, 2006, Merritt.
U.S. Appl. No. 11/634,647, filed Dec. 6, 2006, Merritt et al.
U.S. Appl. No. 12/164,974, filed Jun. 30, 2008, Merritt et al.
U.S. Appl. No. 12/164,987, filed Jun. 30, 2008, Merritt et al.

\* cited by examiner

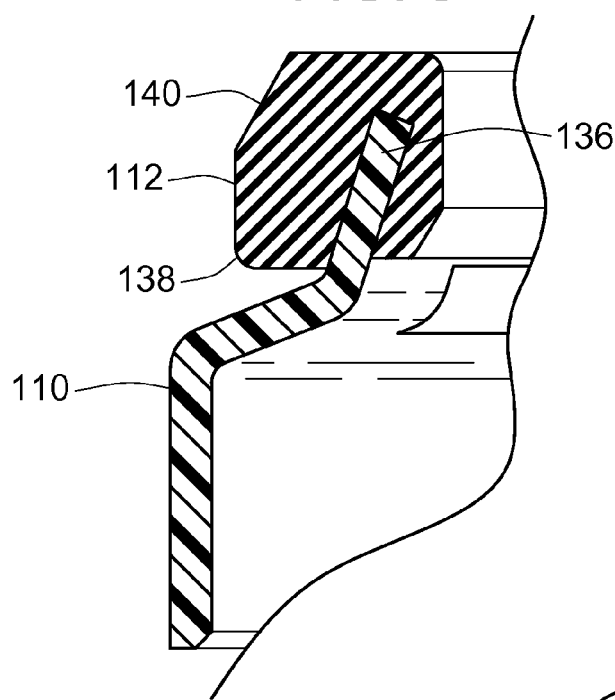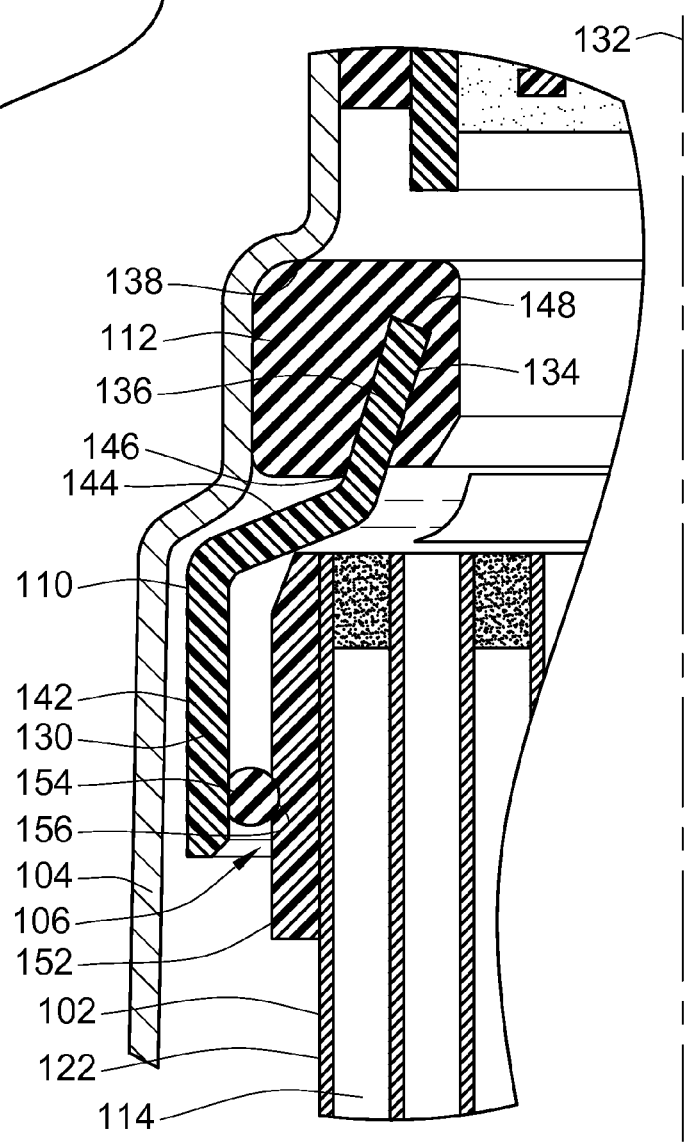

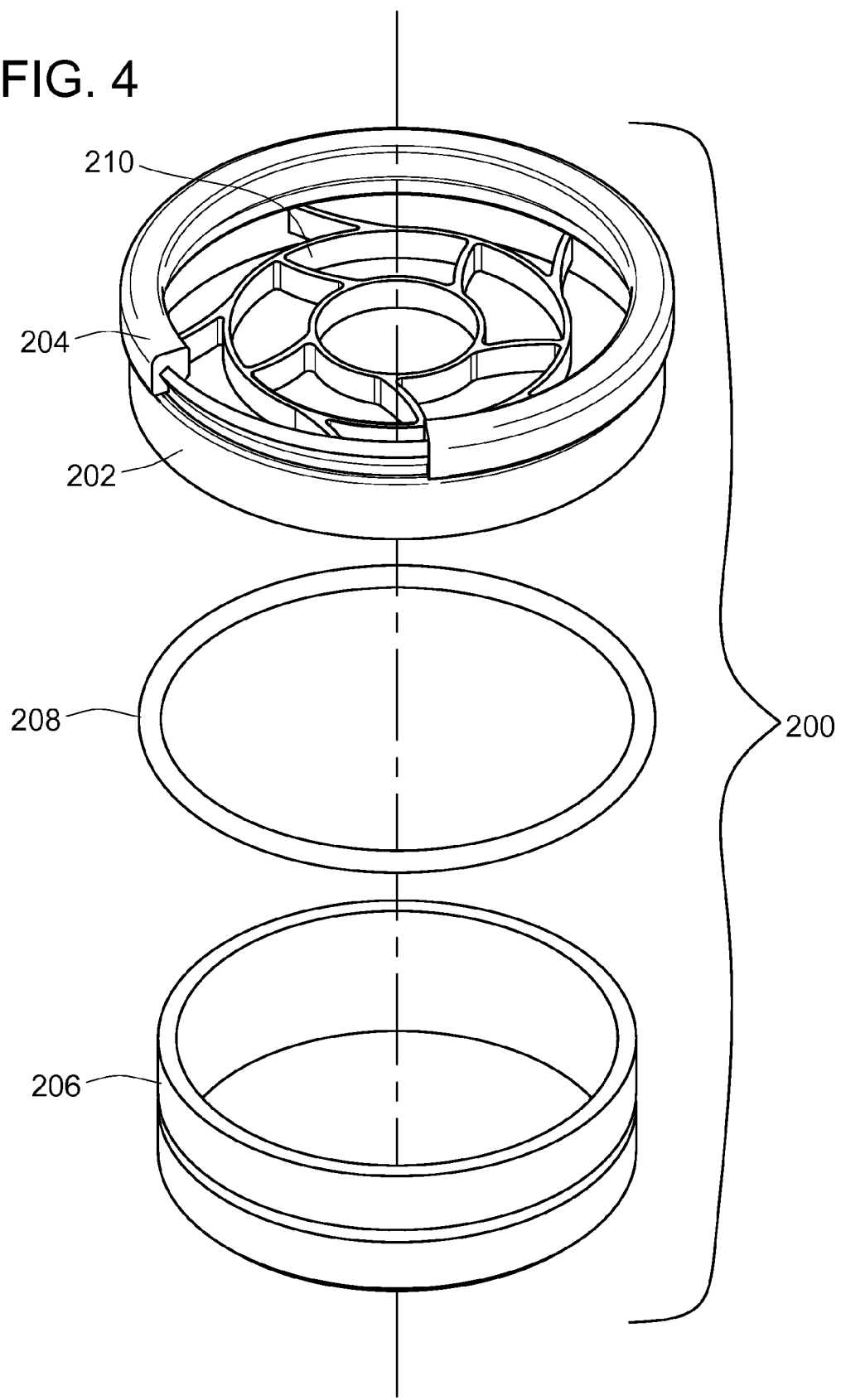

FLUTED FILTER APPARATUS

CROSS-REFERENCE TO RELATED PATENT APPLICATIONS

This patent application is a continuation-in-part of U.S. patent application Ser. No. 11/355,064, filed Feb. 15, 2006, the entire teachings and disclosure of which are incorporated herein by reference thereto. This patent application is a continuation-in-part of U.S. patent Ser. No. 10/979,867, filed Nov. 2, 2004, the entire teachings and disclosure of which are incorporated herein by reference thereto.

FIELD OF THE INVENTION

This invention relates to fluid filters, and more particularly to filters having a housing adapted for receiving a filter element including a seal member for sealing a juncture between the filter housing and the filter element when the filter element is installed in filter housing.

BACKGROUND OF THE INVENTION

Filters of the type used for filtering particulate matter from fluid sometimes include a filter housing having an inlet for receiving the fluid with entrained particulate matter, and an outlet for delivering the filtered fluid to a device needing fluid that is free of particulate matter. For example, a filter may be provided at the air inlet of an engine or an air compressor to remove dust, water, or other particulate matter that could cause damage to the engine or compressor if it were not removed from the air entering the engine or compressor.

In such filters, the particulate matter is typically removed by a filter element that is installed within the filter housing in such a manner that the fluid must flow through a filter element, including a filter pack of porous filter material, which removes the particulate matter from the fluid. Over time, the filter pack of the filter element becomes plugged or coated with particulate matter, necessitating removal and replacement of the filter element in order for the filter to continue in its function of supplying particulate-free fluid at the outlet of the housing.

In order to facilitate removal and replacement of the filter element, it is known to configure the filter housing to include a generally tubular wall section thereof, and provide a seal member mounted on the filter element that seals the juncture between an inner surface of the tubular wall section and the filter element, when the filter element is inserted into the housing, so that the fluid cannot bypass the filter element while flowing through the housing. Prior approaches to providing such sealing arrangement are disclosed in U.S. Pat. No. 6,190,432 to Gieseke et al., and in U.S. Pat. No. 6,517, 598 B2 to Anderson et al.

Further, as shown in FIG. 9, filter apparatuses 710 of the type used for filtering particulate matter from fluid sometimes include a filter housing 712 having an inlet 714 for receiving the fluid with entrained particulate matter, and an outlet 716 for delivering the filtered fluid to a device needing fluid that is free of particulate matter. For example, a filter may be provided at the air inlet of an engine or an air compressor to remove dust, water, or other particulate matter that could cause damage to the engine or compressor if it were not removed from the air entering the engine or compressor.

In such filters 710, the particulate matter is typically removed by a primary filter element 718 that is installed within the filter housing 712 in such a manner that the fluid must flow through the primary filter element 718, in traveling from the inlet 714 to the outlet 716 of the filter 710. The filter element 718 includes a filter pack 720 of porous filter material, which removes the particulate matter from the fluid. Over time, the filter pack 720 of the primary filter element 718 becomes plugged or coated with particulate matter, necessitating removal and replacement of the primary filter element 718, in order for the filter 710 to continue in its function of supplying particulate-free fluid at the outlet 716 of the filter 710.

In order to facilitate removal and replacement of the primary filter element 718, it is known to configure the filter housing 712 to include a generally tubular wall 724 thereof, and to provide a seal member 742, mounted on the primary filter element 718, for sealing the juncture between an inner surface 726 of the tubular wall 724 and the filter element 718, when the primary filter element 718 is inserted into the housing 712, so that the fluid cannot bypass the primary filter element 718 while flowing through the housing 712.

Such filter apparatuses also sometimes include a secondary filter 727, inserted into the housing 712 downstream from the primary element 718. The secondary filter 727 is used as a safety filter, in case the primary filter 718 should come apart in service. Where the direction of airflow through the primary filter 718 is downward, as shown in FIG. 9, the secondary filter 727 also provides a means for catching any particulate matter that might otherwise fall from the primary filter element 718 into the outlet 716 of the housing 712, when the primary filter element 718 is replaced. Typically, the secondary filter element 727 is not replaced as frequently as the primary filter element 718.

In one commonly used prior filter apparatus 710, as shown in FIG. 9, the tubular wall 724 of the housing 712 is stepped to form first 728, second 730 and third 732 tubular sections of the housing 712, sequentially arranged along a longitudinal axis 734 of the filter housing 712, and having progressively decreasing cross-sectional areas. The inner surface 726 of the filter housing 712 defines a cavity 736 extending along the axis 734, with the inlet 714 at one axial end of the cavity 736 and the outlet 716 at the opposite axial end of the cavity 736. The first tubular section 728 extends from the inlet 714. The third tubular section 732 is disposed adjacent the outlet 716, and the second tubular section 730 connects the first and second tubular sections 728, 732. U.S. Pat. No. 6,517,598 to Anderson et al., illustrates a filter apparatus 710 of the type depicted in FIG. 9.

The secondary filter element 727 is inserted into the third tubular section 732, and seals against the inner surface 726 of the housing 712. The secondary filter 727 typically includes a filter material 729 attached to a rigid frame 731. The upstream side of the frame 731 is configured to function as a handle which can be grasped during insertion and removal the secondary filter 727. U.S. Pat. No. 6,517,598 to Anderson et al. and U.S. Pat. No. 6,211,122 to Gieseke et al., disclose this type of secondary filter element. Where the housing has a large cross-section, it has also sometimes been the practice in the past to include a specially formed handle on the frame 731 of secondary filter 727, with the handle extending some distance upstream, between the primary and secondary filter elements 718, 727, as illustrated in U.S. Pat. No. 6,235,195 to Tokar.

The primary filter element 718 includes the filter media pack 720, a mounting flange 740 attached to the inlet end of the media pack 720, and a seal support frame 744, which includes an annular axial extension thereof that projects axially from the outlet end of the media pack 720, for supporting the seal 742. The seal 742 is configured to seal radially against the inner surface 726 of the second tubular section 730 of the housing 712.

The seal support frame 744 typically includes webs 746 extending completely across the outlet end of the media pack 720. These webs 746 are provided to resist pressure forces acting on the media pack 720, which could cause the center of the media pack 720 to bow outward in a downstream direction. It has heretofore been believed, by those having skill in the art, that such webs 746 extending completely across the outlet face of the media pack 720 were particularly necessary in media packs formed by coiling layers of convoluted filter material to form a so-called "fluted filter," in order to prevent the center of the filter media pack 720 from telescoping in a downstream direction under maximum rated inlet fluid pressures. U.S. Pat. No. 6,190,432 to Gieseke et al. and U.S. Pat. No. 6,610,177 to Tsay et al., disclose filter packs having seals attached to axially extending annular portions of a seal support frame.

As illustrated at 'A' in FIG. 9, having the seal 742 mounted on an axially extending annular extension of the seal support frame 744, together with the space occupied by the webs 746 at the outlet end of the filter pack 720, and the portions of the frame 731 of the secondary filter element 727 disposed between the primary and secondary filters 718, 727, undesirably consumes a significant portion of the volume in the cavity 736 of the housing 712 between the primary and secondary filters 718, 727. This is particularly true where the secondary filter element 727 includes a handle, as disclosed by Tokar.

It is desirable, therefore, to provide an improved filter element, and filter apparatus in a form which better utilizes the volume inside of the cavity of the filter housing, and particularly in a form which better utilizes the volume between the primary and secondary filter elements in a filter apparatus, of the type described above, which includes both a primary and a secondary filter element.

BRIEF SUMMARY OF THE INVENTION

Embodiments of the invention provide an improved filter element and filter apparatus, through the use of a filter element having alternating layers of a face sheet material and a convoluted filter material, with the alternating layers forming substantially longitudinally oriented flutes that extend axially along, or past, a radially acting seal into previously unused portions of the cavity of a filter housing. In some embodiments of the invention, structures such as struts extending partially across an outlet end of the filter element, or a layer of resin extending axially a potted length into some of the flutes from the outlet end, are provided to resist axially oriented pressure forces on the alternating layers.

Embodiments of the invention may take the form of a filter element, a filter apparatus, or a method for forming or using a filter element, or a filter apparatus, according to the invention.

In one embodiment of the invention, a filter element includes a media pack, a seal support ring, and a radially acting seal. The media pack defines a longitudinal axis of the filter element and includes a plurality of alternating layers of a face sheet material and a convoluted filter material, with the alternating layers forming substantially longitudinally oriented flutes for passage of a fluid through the filter element. The plurality of alternating layers define an outer periphery of the media pack extending axially from an inlet end of the media pack to an outlet end of the media pack. The seal support ring includes a body thereof that is disposed radially about and attached to the outer periphery of the media pack, adjacent the outlet end of the media pack, but not extending substantially axially beyond the outlet end of the media. The seal is attached to the seal support ring and axially spaced from the outlet end a distance such that the longitudinally oriented flutes of the filter pack extend axially along the seal. In some embodiments of the invention, the longitudinally oriented flutes of the filter element may extend axially beyond the seal.

The alternating layers of face sheet material and convoluted filter material, may be secured to one another with adhesive beads disposed on both sides of the layers of convoluted filter material, with the glue beads sized for securing the convoluted layers to the adjacent layers of face sheet material without blocking flow through the flutes.

Embodiments of the invention may also include a layer of resin extending axially a potted length into some of the flutes from the outlet end of the media pack. The layer of resin may also include at least a portion of the body of the seal support ring, and in some forms of the invention may include the whole seal support ring. The seal support ring may extend axially from the outlet end of the media pack a distance greater than the potted length.

In some embodiments of the invention, the seal support ring may include a plurality of through-holes therein, with the seal being molded onto the seal support ring in such a manner that portions of the seal extend through the through-holes and bond the seal and seal support ring to the media pack. The seal support ring may also include a plurality of struts extending partially across the outlet end of the filter element.

In another embodiment of the invention, a filter apparatus includes a filter housing and a filter element disposed in the filter housing. The filter housing defines a longitudinal axis of the filter apparatus and has an inner surface defining a cavity extending along the axis and having an inlet at one axial end of the cavity and an outlet at an opposite axial end of the cavity. The inner surface of the filter housing includes at least first and second sections thereof, with the first section extending axially from the inlet and defining a fast substantially radially inwardly facing surface, and the second section being axially disposed between the first section and the outlet. The second section protrudes radially inward beyond the first section and defines a second substantially radially inward facing surface.

The filter element defines an outer peripheral surface thereof extending axially from an inlet end to an outlet end of the filter element, with the outer peripheral surface of the filter element including an outlet end portion thereof disposed at least partially within the second section of the housing. The filter element includes a media pack having a plurality of alternating layers of a face sheet material and a convoluted filter material, with the alternating layers forming substantially longitudinally oriented flutes extending to the outlet end of the filter element for passage of a fluid through the filter element. The filter element also includes a radially acting seal, attached to the outlet end portion of the outer periphery of the filter element. The seal is axially spaced from the outlet end of the filter element a distance such that the longitudinally oriented flutes of the filter pack extend axially along the seal, and at least partially along the second substantially radially inwardly facing surface of the housing, when the seal is acting against one of the first or second substantially radially inwardly facing surfaces.

The longitudinally oriented flutes of the filter element may extend axially beyond the seal, and in some forms of the invention may extend substantially completely through the second section of the housing.

The inner surface of the filter housing may further include a third section thereof disposed axially between the outlet and the second section of the inner surface of the filter housing, with the third section defining a third substantially radially inwardly facing surface. The outlet end portion of the filter element may be disposed at least partially within the third substantially inwardly facing surface, and the radially acting seal may be attached to the outlet end portion of the outer periphery of the filter element and axially spaced from the outlet end of the filter element a distance such that the longitudinally oriented flutes of the filter pack extend axially along the seal and at least partially along the third substantially radially inwardly facing surface when the seal is acting against one of the first or second substantially radially inwardly facing surfaces of the housing.

Other aspects, objectives and advantages of embodiments of the invention will be apparent from the following detailed description and the accompanying drawings.

BRIEF DESCRIPTION OF THE DRAWINGS

FIG. 2 is an enlarged partial cross-section, of the area within the circle of FIG. 1, showing details of a sealing apparatus of the filter apparatus of FIG. 1.

FIG. 3 is a partial cross-sectional view of a portion of a seal support frame and a primary seal member, of the sealing apparatus of FIG. 2, illustrating an inwardly angled canted annular extension, of the seal support frame, supporting a primary seal member.

FIG. 4 is a perspective view of a further embodiment of the invention, in the form of a sealing apparatus, for operatively and separably connecting a filter element to a filter housing, but not including a filter element or a filter housing.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
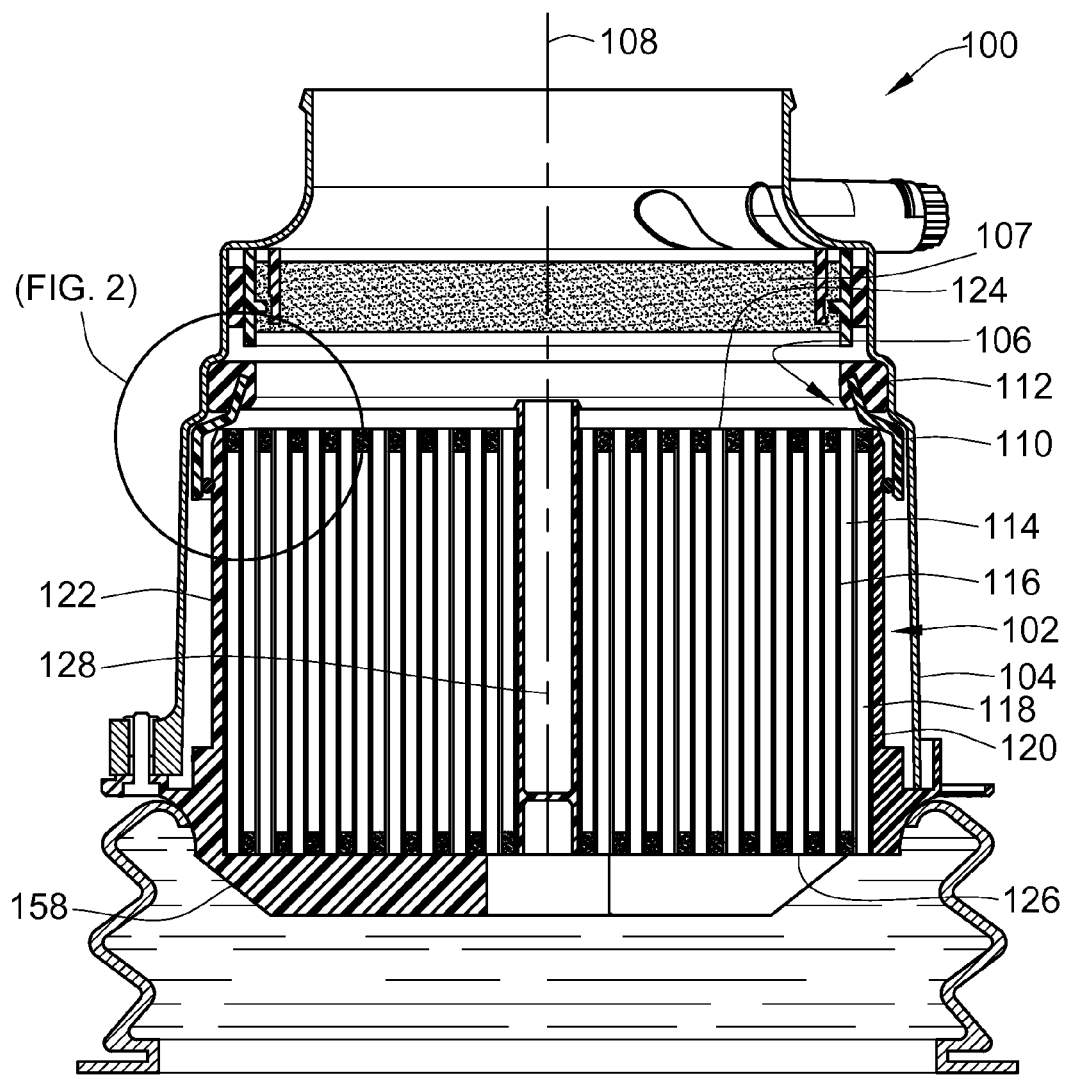
FIG. 1 a cross-section of an embodiment of the invention, in the form of a filter apparatus.

FIG. 1 shows a first embodiment of the invention in the form of a filter apparatus 100 including a filter element 102, a filter housing 104, and a sealing apparatus 106, for filtering a flow of fluid, entering the bottom and exiting from the top of the filter apparatus 100 (as oriented in FIG. 1). It should be further noted that the filter apparatus 100 of the first exemplary embodiment also includes a safety filter 107, mounted in the filter housing 104 at a point in the fluid flowpath downstream from the filter element 102. Other embodiments of a filter apparatus, may include fewer or more components than the filter assembly 100 of the first exemplary embodiment.

The term fluid as used herein is intended to include fluids in either liquid or gaseous forms. The exemplary embodiments shown herein specifically illustrate an air filter of the type used for filtering intake air for engines and air compressors.

The filter element 102 and the sealing apparatus 106 are adapted for insertion into the filter housing 104, along a longitudinal axis 108 of the filter housing 104, with the sealing apparatus 106 including a seal support frame 10 and a primary seal member 112 for operatively and separably connecting the filter element 102 to the filter housing 104. The filter housing 104, filter element 102, the seal support frame 110 and the primary seal member 112 of the filter apparatus 100 of the first exemplary embodiment all have a generally circular cross-sectional shape. In other embodiments, however, these components may have other cross-sectional shapes, such as oval, race-track-like (with straight sides joining rounded ends), rectangular, square or polygonal.

The filter element 102 of the first exemplary embodiment includes a filter pack 114 formed from a coil of fluted filter media 116, as is known in the art, having flutes formed by a convoluted sheet of porous filter material 118, and a face sheet 120, also preferably formed from a porous filter material, attached to one side of the convoluted sheet 118. The filter pack 114 includes an outer periphery 122 thereof joining first and second oppositely facing flow faces 124, 126 and defining a longitudinal axis 128 of the filter pack 114 that extends substantially coincident with the longitudinal axis 108 of the filter housing 104, when the filter element 102 is installed in the filter housing 104, and passes through the first and second flow faces 124, 126 of the filter pack 114. The outer periphery 122, first and second flow faces 124, 126, and the longitudinal axis 128 of the filter pack 114 also define an outer periphery, first and second flow faces, and a longitudinal axis of the filter pack element 102, which will be identified in the figures and the following description by the same reference numerals used to identify the identical features of the filter pack 114.

The ends of adjacent flutes in the filter media 116 are alternately blocked, or left open, at the first and second flow faces 124, 126, so that fluid entering open flutes through the second flow face 126 of the filter element 102 (at the bottom of the filter apparatus 100 as shown in FIG. 1) is forced to flow through the sheet of porous filter material 118, and/or the face sheet 120 into an adjacent flute, in order to exit through the first flow face 126 of the filter element 102. The convoluted sheet 118 may be formed by any appropriate process, such as corrugating or pleating, but is preferably formed by gathering, in the manner described in a U.S. patent application Ser. No. 10/979,390, entitled "Gathered Filter Media and Method of Making Same," filed Nov. 2, 2004, assigned to the Assignee of the present invention, filed concurrently herewith and incorporated herein by reference. The filter media 116 may also include an intermediate seal (not shown), as described in a U.S. patent application Ser. No. 10/979,453, entitled "Fluted Filter Media with Intermediate Flow Restriction and Method of Making Same," filed Nov. 2, 2004, assigned to the Assignee of the present invention, filed concurrently herewith and incorporated herein by reference.

Those having skill in the art will recognize, however, that embodiments of the invention can also be practiced with efficacy using filter packs having medias and constructions other than the fluted media 116 shown and described herein with respect to the exemplary embodiments. It will also be recognized that, although the first and second flow faces 124, 126 of the filter pack 114 and filter element 102 of the exemplary embodiments shown herein are essentially flat and axially facing, in other embodiments of the invention the first and second flow faces may have other profiles, such as convex or concave, stepped, or conical.

As shown in an enlarged view in FIG. 2, the seal support frame 110 has a first axial end 130 thereof adapted for insertion of the filter element 102 into the seal support frame 110, along a centerline 132 of the seal support frame 110 that extends substantially coincident with the longitudinal axis 108 of the filter housing 104 and the longitudinal axis 128 of the filter element 102 and filter pack 114, when the sealing apparatus 106 is operatively connecting the filter element 102 to the filter housing 104. The seal support frame 106 also has a second end 134 thereof, forming a canted annular extension 136 of the seal support frame 110, which projects at an oblique angle to the centerline 132 of the seal support frame 110.

The term "oblique," is used herein in accordance with the common dictionary meaning of that word to indicate that the canted annular extension 136 extends at an angle, with respect to the centerline 132 of the seal support frame 110, which is neither parallel nor perpendicular to the centerline 132 of the seal support frame 110. The term "annular," is also used herein, according to its common dictionary definition, to describe a variety of ring-like shapes disposed about an axis or centerline Annular shapes, as contemplated by the inventors, may include, but are not limited to, shapes that are round, rectangular, oval, or race-track-like with two generally straight and parallel sides joined by rounded ends.

The primary seal member 112, of the sealing apparatus 106 of the first exemplary embodiment, is attached to the canted annular extension 136 of the seal support frame 110, and defines a sealing surface 138 thereof that is adapted for contacting and sealing against the filter housing 104, when the sealing apparatus 106 is operatively connecting the filter element 102 to the filter housing 104. As shown in FIG. 3, the seal member 112 of the exemplary embodiment includes a lead in chamfer 140 for facilitating insertion of the sealing apparatus 106 into the filter housing 104.

The first axial end 130 of the seal support ring includes a lip 142, which is adapted for circumscribing the outer periphery 122 of the filter pack 114 and filter element 102, and an angled intermediate section 144 extending from the lip 142. The canted annular extension 136 of the first exemplary embodiment extends from a juncture 146, of the canted annular extension 136 with the intermediate section 144 of the first axial end 130 of the seal support frame 110, to a distal end 148 of the canted annular extension 136, and is angled inward, with respect to the centerline 132 of the seal support frame 136, from the juncture 146 to the distal end 148 of the canted annular extension 136, such that the distal end 148 of the canted annular extension 136 has a smaller periphery than the juncture 146.

Having the canted annular extension 136 angled inward provides an advantage during initial insertion of the sealing apparatus 106 into the filter housing 104, by providing additional space between the sealing surface 138 of the primary seal 112 and the distal end 148 of the canted annular extension 136. By virtue of this arrangement, the force required during insertion for compressing the seal member 112 is lowered at the beginning of insertion into the housing 104, and increases progressively as the sealing apparatus 106 is inserted further into the filter housing 104, toward its final installed position as shown in FIGS. 1 and 2. Those having skill in the art will also recognize that having the canted annular extension 136 angled inward, and thus angled in the same direction as the lead in chamfer 140 on the primary seal member 112, results in a greater degree of reduction of initial insertion force that could be achieved through use of either the lead in chamfer 140 or the inward angling of the canted annular extension 136 alone.

As shown in FIG. 2, in an embodiment of the invention, the sealing apparatus 106 further includes a secondary seal support ring 150 attached to the outer periphery 122 of the filter pack 114. The seal support ring 150 has an outer surface 152 that forms a portion of outer periphery 122 of the filter element 102. In various embodiments of the invention, the seal support ring 150 may be attached to the outer periphery 122 of the filter pack 114 with an adhesive, or be press fitted onto the filter pack 114.

The sealing apparatus 106 further includes a secondary seal member 154 adapted for placement between the outer surface 152 of the secondary seal support ring 150 and the seal support frame 110 for providing a seal between the seal support frame 110 and the outer periphery 122 of the filter element 102. In the exemplary embodiment of the filter apparatus 100, the secondary seal member 154 is an O-ring packing, and the outer surface 152 of the secondary seal support ring 150 includes a groove 156 for retaining the O-ring within the groove 156 during insertion of the filter element 102 into the seal support frame 110.

In other embodiments of the invention, the secondary seal member 154 may take other shapes or forms, some of which may not require a groove 156 for retaining the secondary seal member in place on the secondary seal ring 150, during insertion of the filter element 102 in to the seal support frame 110. In some embodiments of the invention, where the secondary seal support ring 150 is press fitted onto the filter pack 114, it may be removable and reusable with replacement filter elements 102, in order to reduce both cost of the replacement element 102 and the amount of material that must be discarded or recycled when a filter element 102 is replaced.

FIG. 4 shows a second exemplary embodiment of the invention, in the form of a sealing apparatus 200, including a seal support frame 202, a primary seal member 204, a secondary seal support ring 206, and a secondary seal member 208, for sealing a juncture between a filter housing and a filter element, but not including either the filter element or the housing. The seal support frame 202, a primary seal member 204, a secondary seal support ring 206, and a secondary seal member 208 of the second exemplary embodiment are identical to the seal support frame 106, primary seal member 112, secondary seal support ring 150, and secondary seal member 154. As shown in FIG. 4, in a sealing apparatus according to an embodiment of the invention, the seal support frame 202 and/or the secondary seal support ring 206 may include a screen 210 or struts extending across the interior to perform functions such as providing resistance to radial stresses, or to provide axial retention of the end of the filter pack.

Another embodiment of the invention illustrates that a sealing apparatus 200, or parts thereof, may be manufactured or supplied separately from either or both of a filter housing and a filter element. In some embodiments of the invention, for example, it may be desirable to supply any or all of the components of the seal apparatus 200 (i.e. a seal support frame 202, a primary seal member 204, a secondary seal support ring 206, and/or a secondary seal member 208) as separate parts. In other embodiments, the seal apparatus 200 may include only the seal support frame 202 and the primary seal member 204, with the first end of the seal support frame 202 being adapted for separable insertion of a filter element, not including a secondary seal ring or secondary seal, into the seal support frame 202. Alternatively, a sealing apparatus 200 may include only the seal support frame 202, the primary seal member 204, and the secondary seal member 154, with the first end of the seal support frame 202 being adapted for separable insertion of a filter element having its outer periphery sealed to the seal support frame 202 by the secondary seal member 204.

Figure 5:
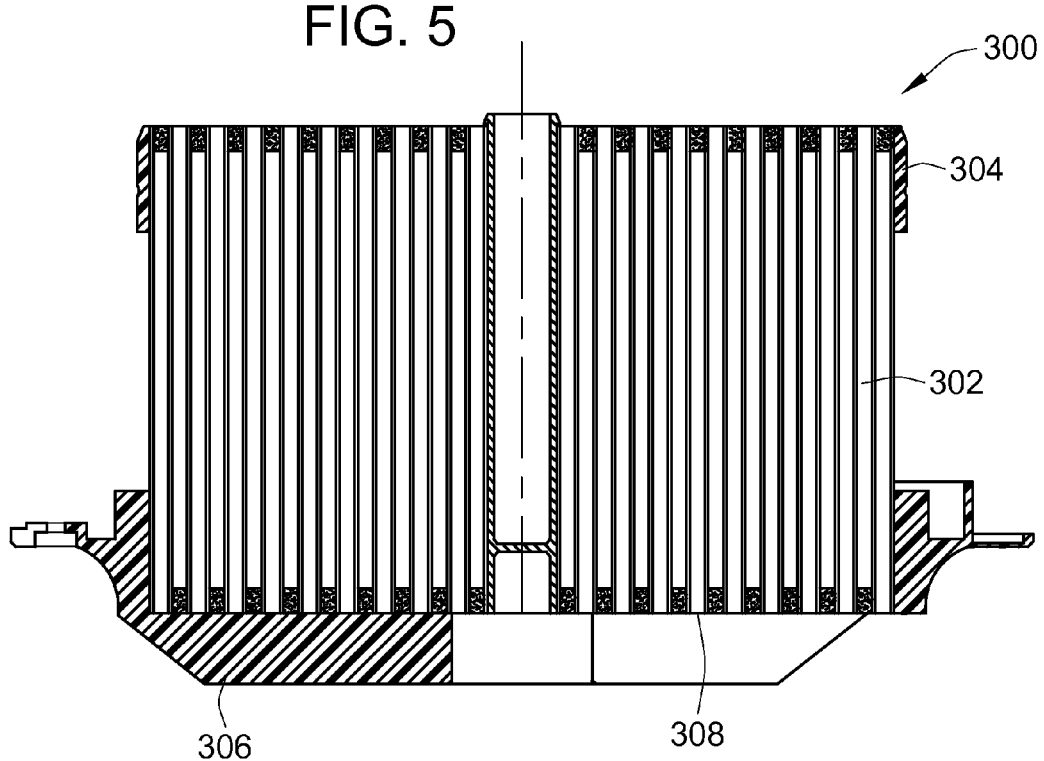
FIG. 5 is a cross-section of another embodiment in the form of a filter element.

FIG. 5 illustrates a further embodiment of the invention, in the form of a filter element 300 that is adapted for connection to a filter housing through a seal support frame and a primary seal member but not including the seal support frame, the primary seal member or the housing. The filter element 300 is identical to the filter element 102 of the filter apparatus 100 of the first exemplary embodiment, and includes a filter pack 302, which is identical to the filter pack 114 of the first exemplary embodiment, and a secondary seal support ring 304, which is identical to the secondary seal support ring 150 of the first exemplary embodiment, attached to the outer periphery of the filter pack 302. In various embodiments, the filter element 300 may also include other components of a sealing apparatus, such as a secondary seal member, either affixed to the secondary seal support ring 304 or separable from the secondary seal support ring 304. In some embodiments, a filter element 300 may also include other components similar to those described above in relation to the seal apparatus 200 of the second exemplary embodiment, such as a separable seal support frame having a canted annular extension and a primary seal member which may be affixed to the canted annular seal extension or be separable from the canted seal extension.

It will be further noted that both the filter element 102 of the first exemplary embodiment, and the filter element 300 of the third exemplary embodiment, may include other structures, such as the bolting flange 158, 306, shown in FIGS. 1 and 5, attached to the first flow face 126, 308 of the filter pack 114, 302 for attaching the filter element 102, 300 to a housing.

Figure 6:
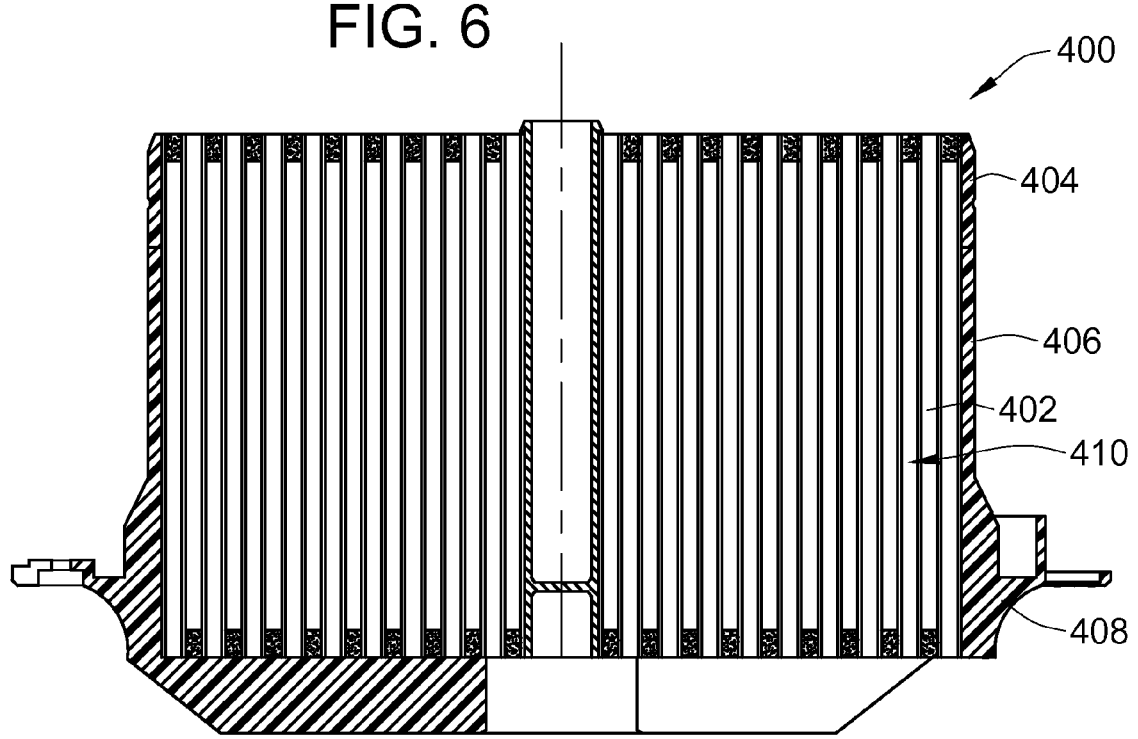
FIG. 6 is a cross-section of a further in the form of a filter element having a secondary seal support ring, according to the invention that also includes an outer annular peripheral sidewall circumscribing a filter pack, and a bolting flange for securing the filter element to a filter housing.

In some embodiments, a secondary seal support ring may include additional features and provide additional functionality, as compared to the exemplary embodiments described above. For example, FIG. 6 shows a further embodiment of the invention, in the form of a filter element 400 that is adapted for connection to a filter housing through a seal support frame and a primary seal member, but not including the seal support frame, the primary seal member or the housing. The filter element 400, of the fourth exemplary embodiment, is similar to the filter element 300 of the third exemplary embodiment, except for the configuration of a secondary seal support ring 404, disposed around a filter pack 402. The secondary support ring 404 of the filter element 400 includes an outer peripheral annular sidewall 406 extending from a bolting ring 408, which together form an open ended cavity 410 for receiving the filter pack 402. In some embodiments, a filter element 400 may also include other components similar to those described above in relation to the seal apparatus 200 of the second exemplary embodiment, such as a separable seal support frame having a canted annular extension and a primary seal member which may be affixed to the canted annular seal extension or be separable from the canted seal extension.

Figure 7:
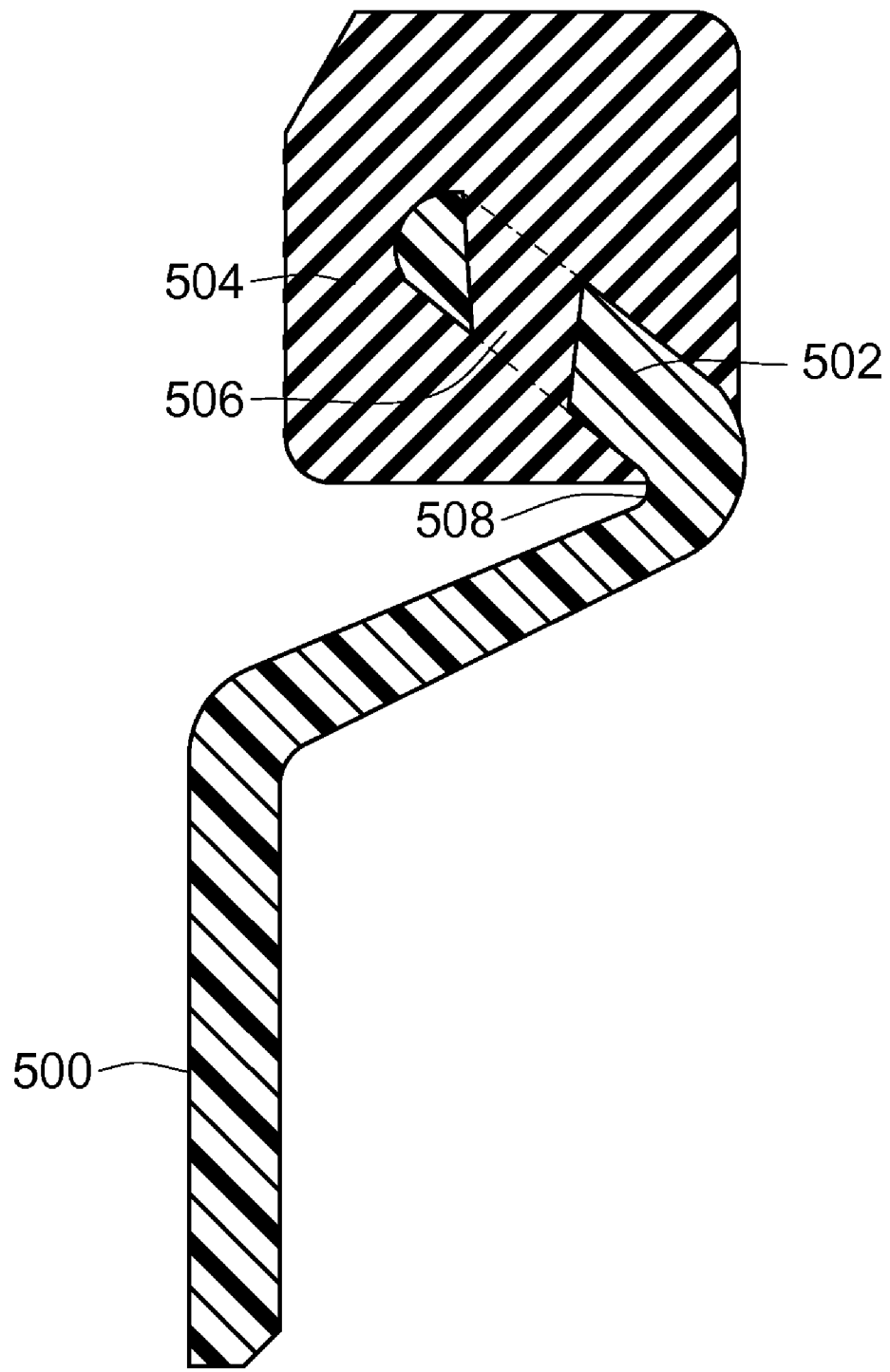
FIG. 7 is a partial cross-sectional view of a portion of a seal support frame and a primary seal member, of an alternate embodiment of the invention, illustrating an outwardly angled canted annular extension, of the seal support frame, supporting a primary seal member.

It will also be recognized that, although embodiments of the invention described thus far utilize a canted annular extension that is angled inward, as described above, in other embodiments it may be desirable to have a canted annular extension 502 of a seal support frame 500 angled outward, as shown in FIG. 7, with a primary seal member 504 being molded onto the canted annular extension 502, and anchored thereupon by portions of the primary seal member 504 that extend through holes 506 in the canted annular extension 502 and into a V-shaped groove 508 of the seal support frame 500.

Figure 8:
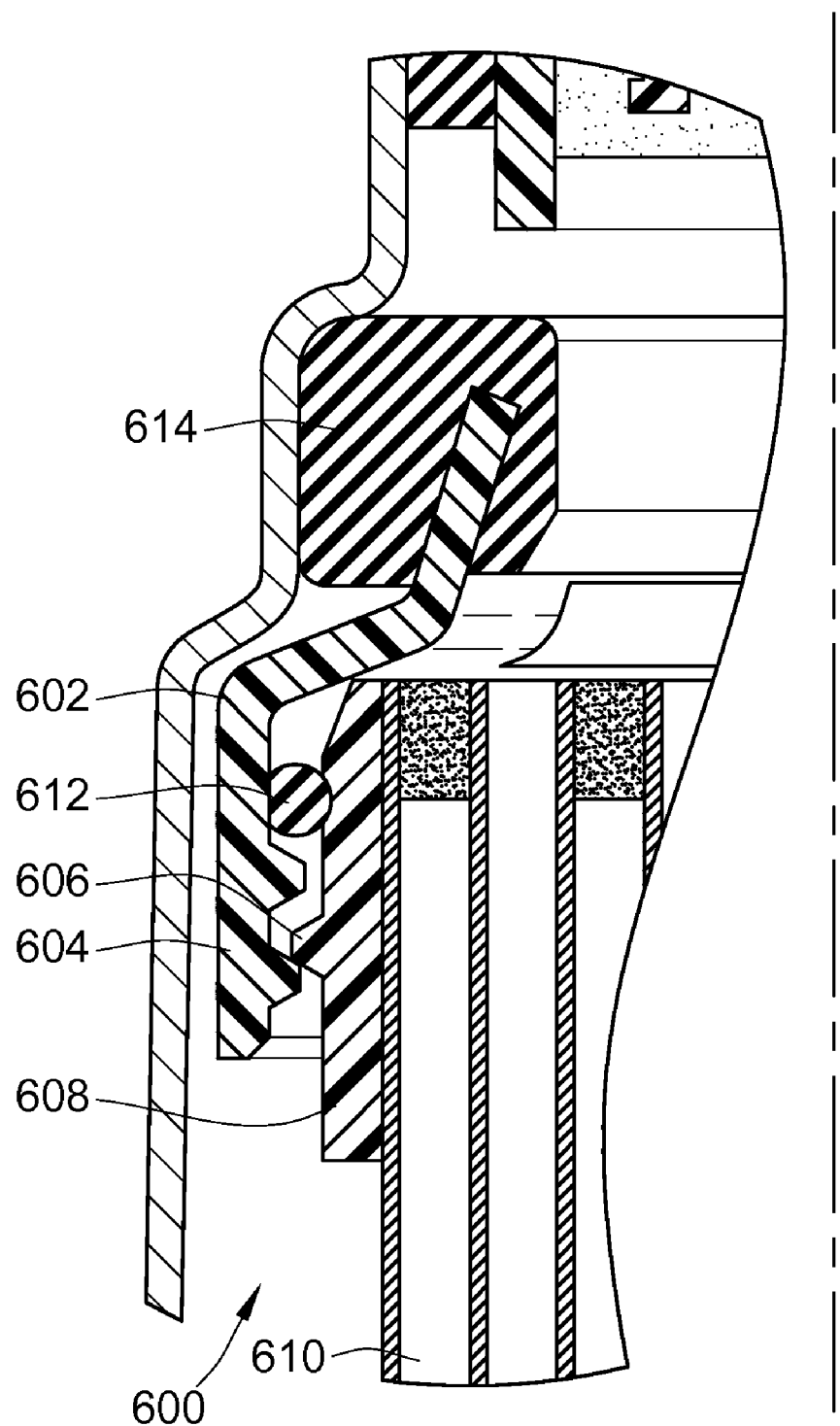
FIG. 8 is a cross-section of an embodiment in the form of a sealing apparatus having a seal support frame and secondary seal support ring that are configured for threaded mechanical connection to one another.

It will also be recognized that, although embodiments of the invention described thus far utilize an operative connection between the filter element and the seal support frame in which an end of the filter element is slidingly inserted into the second end of the seal support frame, in other embodiments, other types of connections may be used. As shown in FIG. 8, for example, a sealing apparatus 600 may include a seal support fame 602 having a female-threaded opening in the second end 604 of thereof for engagement with a male-threaded portion 606 of a secondary seal support ring 608 attached to a filter pack 610. In the embodiment shown in FIG. 8, the sealing apparatus 600 includes a secondary seal member, in the form of an O-ring packing 612, for sealing the juncture between the seal support frame 602 and the secondary seal support ring 608. Those having skill in the art will readily understand that in other embodiments of the invention, other types of mechanical connections, such as bayonet mounts, or snap locks may also be used for connecting the seal support frame to the secondary seal support ring. It will further be understood that, in embodiments of the invention where the mechanical interface is tight enough, between the seal support frame and the secondary seal support ring, a secondary seal may not be necessary.

Those having skill in the art will recognize that a sealing apparatus provides an advantage in that the primary and secondary seals may have different configurations, and/or be made from different materials, that are specially suited to performing their respective functions. For example, it may be preferable to have the primary seal be formed from a urethane foam to provide a significant degree of compressibility between the housing and the canted annular seal support, to compensate for considerable dimensional differences between housings or elements from different manufacturers, in combination with a secondary seal in the form of an O-ring having relatively small cross-section, of a somewhat stiffer material such as flourosilicone or nitrile, so that the outer periphery of the filter pack can be made larger.

The sealing apparatus of embodiments of the invention makes it possible to use a secondary seal of smaller cross-section and stiffer material, because tighter tolerances can be maintained between the outer periphery of the filter pack and the seal support frame, or between the seal support frame and a secondary seal support ring. It may also be desirable to use different materials in instances such as the embodiment of FIG. 8, where the seal support frame 602 is connected to the secondary seal support ring 608 by a threaded connection, whereas the primary seal member 614 is configured for a sliding press fit into a housing. In such an embodiment, it may be preferable to utilize a urethane foam material for the primary seal member 614. Such a urethane material might stand up well, however, when subjected to the friction forces generated on the secondary seal member 612, when the seal support frame 602 and secondary seal support ring 608 are threaded together. In such an embodiment, a secondary seal member 614 of a material such as flourosiliclone might be preferable to provide more resistance to damage during threading together the seal support frame 602 and secondary seal support ring 608, while still providing a suitable radial between the seal support frame 602 and secondary seal support ring 608.

The ability to utilize different types or sizes of seals for the primary and secondary seals also provides other advantages, such as adapting a filter pack or element having one type of sealing arrangement for use in a housing designed to receive a filter pack or element having a different type of sealing arrangement. Filter packs of different sizes or outer peripheries can be adapted for use in a common housing, through the use of sealing apparatuses.

Figure 10:
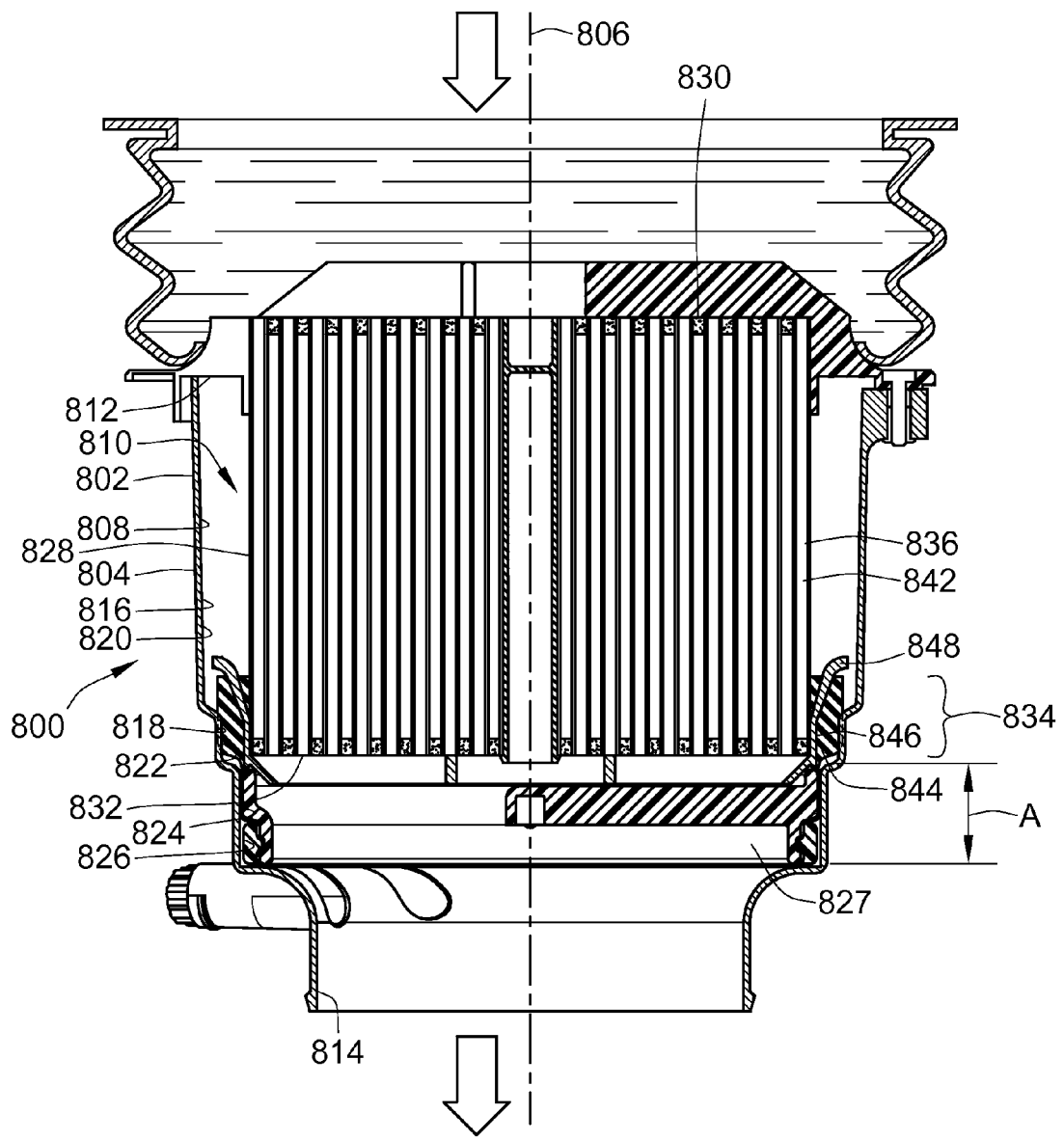
FIG. 10 is a cross-section of an embodiment of a further filter apparatus according to an embodiment of the invention.

FIG. 10 shows a further exemplary embodiment of the invention in the form of a fluid filter apparatus 800 including a filter housing 802 and a filter element 804 disposed in the filter housing 802. The term fluid as used herein is intended to include fluids in either liquid or gaseous forms. The embodiments shown herein specifically illustrate an air filter of the type used for filtering intake air for engines and air compressors.

The filter housing 802 defines a longitudinal axis 806 of the filter apparatus 800 and has an inner surface 808 defining a cavity 810 extending along the axis 806 and having an inlet 812 at one axial end of the cavity 810, and an outlet 814 at an opposite axial end of the cavity 810. The inner surface 808 of the filter housing 802 includes at least first 816 and second 818 sections thereof, with the first section 816 extending axially from the inlet 812 and defining a first substantially radially inwardly facing surface 820, and the second section 818 being axially disposed between the first section 816 and the outlet 814. The second section 818 protrudes radially inward beyond the first section 816 and defines a second substantially radially inward facing surface 822.

The inner surface 808 of the filter housing 802 further includes a third section 824 thereof disposed axially between the outlet 814 and the second section 818 of the inner surface 808 of the filter housing 802, with the third section 824 defining a third substantially radially inwardly facing surface 826. A secondary filter 827 is installed within the third section 824 of the housing 802.

The primary filter element 804 defines an outer peripheral surface 828 thereof extending axially from an inlet end 830 to an outlet end 832 of the filter element 804, with the outer peripheral surface 828 of the filter element 804 including an outlet end portion 834 thereof disposed at least partially within the second section 818 of the housing 802.

Figure 9:
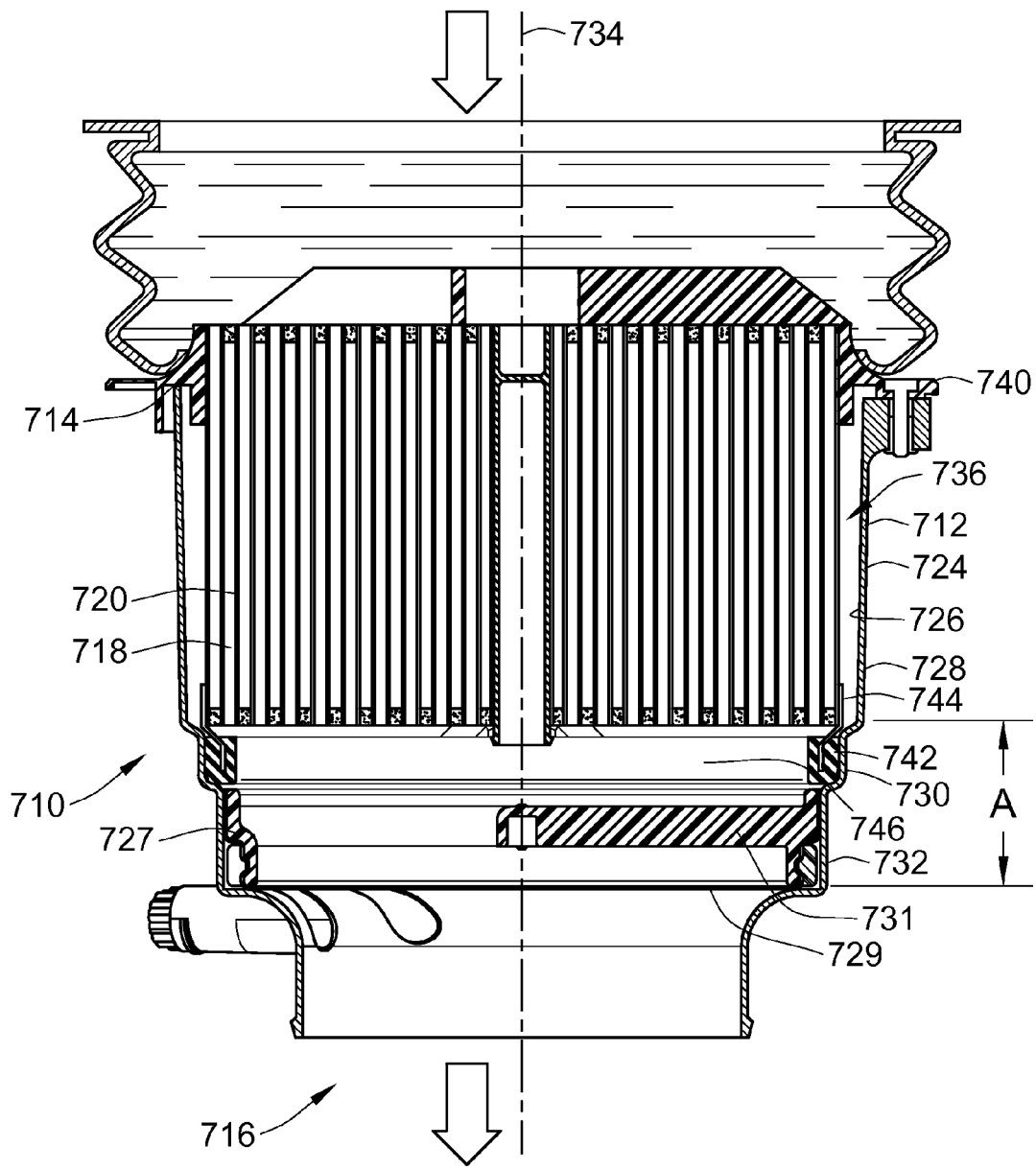
FIG. 9 is a cross-section of a prior filter apparatus having a primary and a secondary filter element mounted in a filter housing having a stepped wall.
Figure 13A:
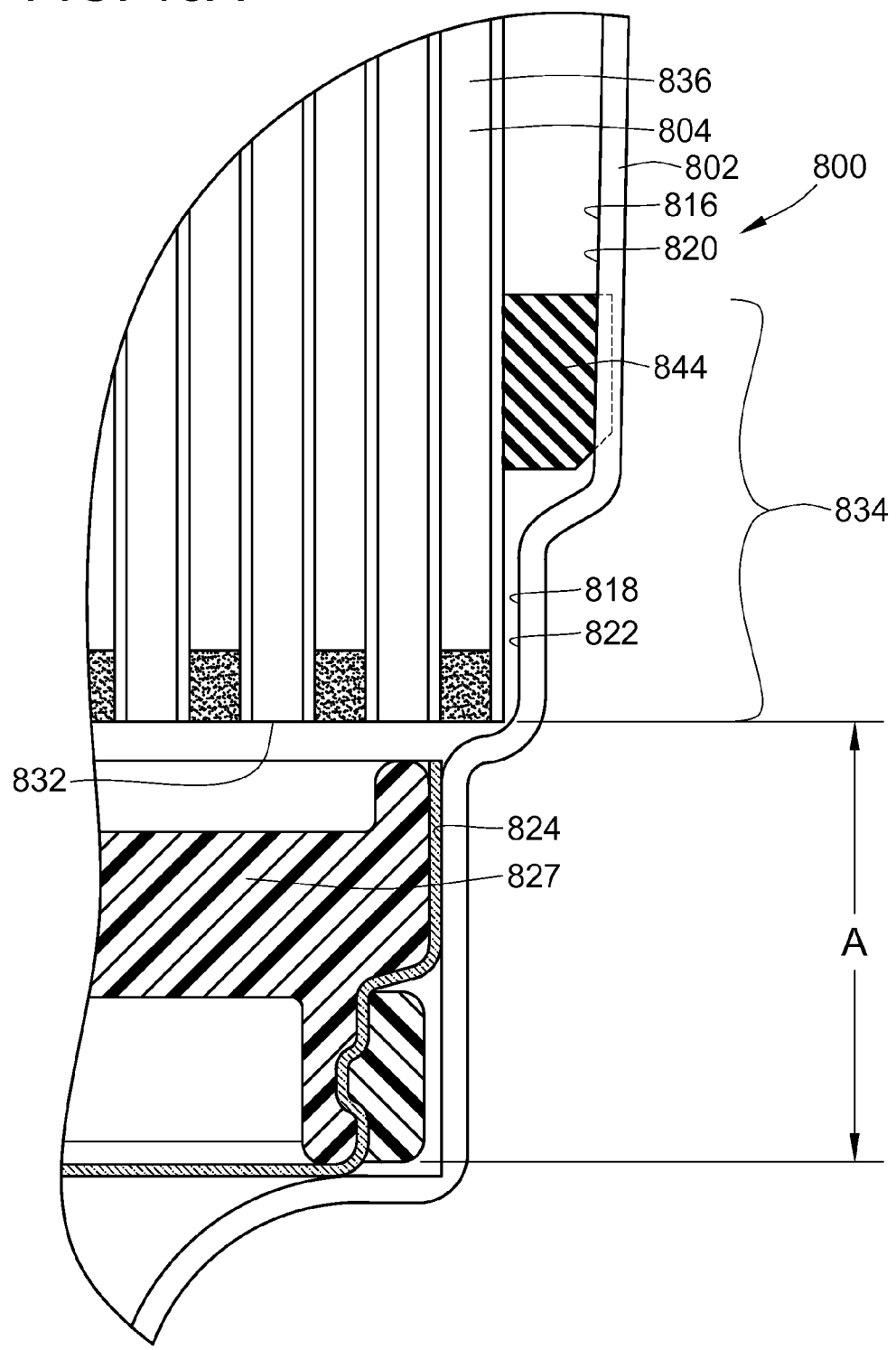
FIGS. 13A and 13B are enlarged partial cross-sections of the same portion of the filter apparatus shown in FIG. 12, showing two alternate embodiments of filter elements.
Figure 13B:
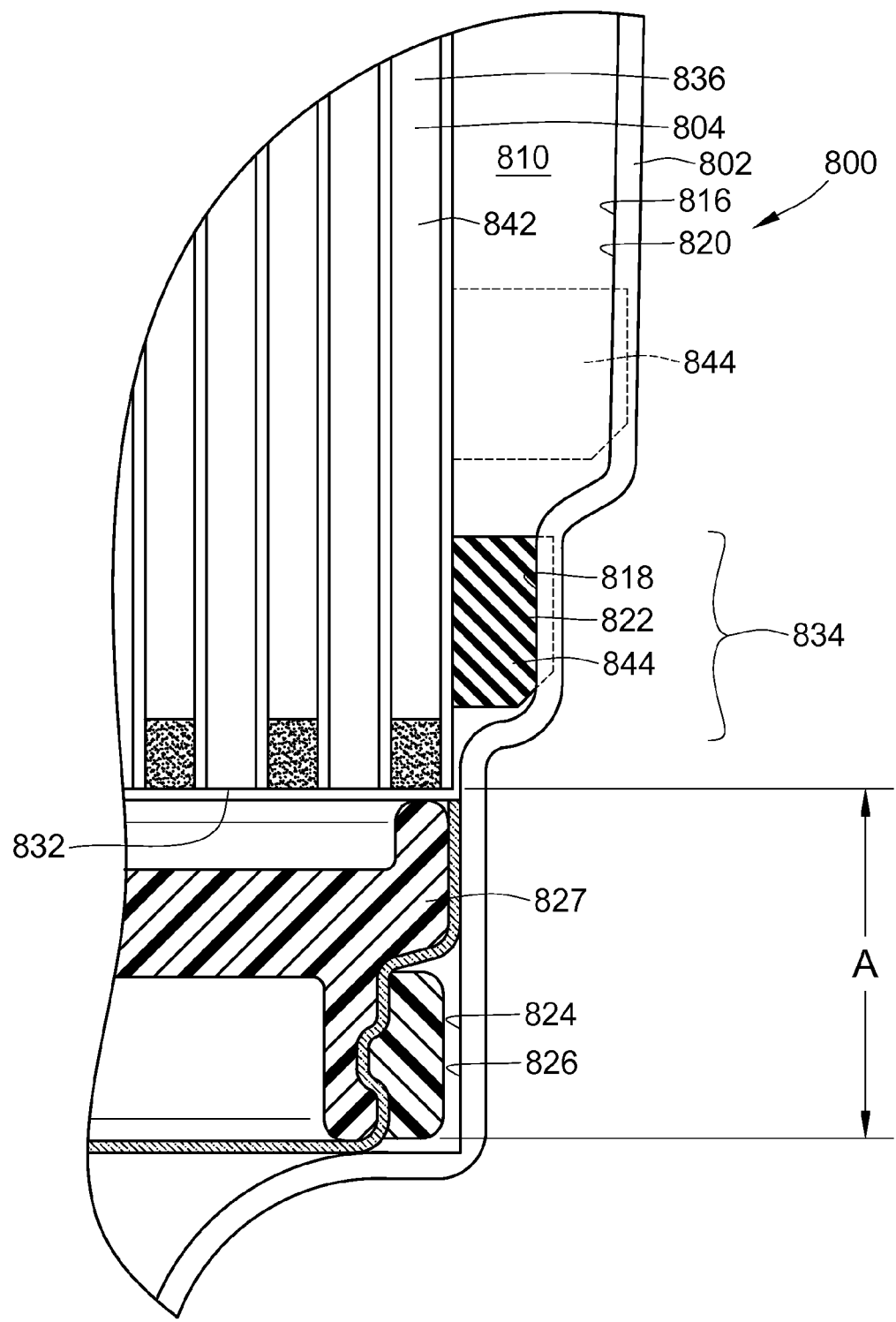

In the exemplary embodiment, the outlet end portion 834 of the filter element 804 extends substantially into the second section 820 of the housing 802, such that the filter element 804 is longer, and slightly smaller in cross-section, as compared to the filter element 720 of the prior filter apparatus 710 shown in FIG. 9. As shown in FIG. 13B, and described in more detail below, in other embodiments, the outlet end portion 834 of the filter element 804 can extend at least partially into the third section 824 of the housing 802, with the length of the filter element 804 being somewhat longer and the cross-section of the filter element 804 being somewhat smaller than the exemplary embodiment shown in FIG. 10.

Through judicious selection of the length and cross-section of the filter element 804, the space inside of the cavity 810 can be used more effectively than in the prior filter apparatus 710 shown in FIG. 9. The resultant volume of the filter element 804, and its filtering capacity, can also be increased, as compared to prior filter elements having seal support frames extending axially beyond the end of the media pack of the filter element, through judicious selection of the dimensions of a filter element 804.

Figure 11:
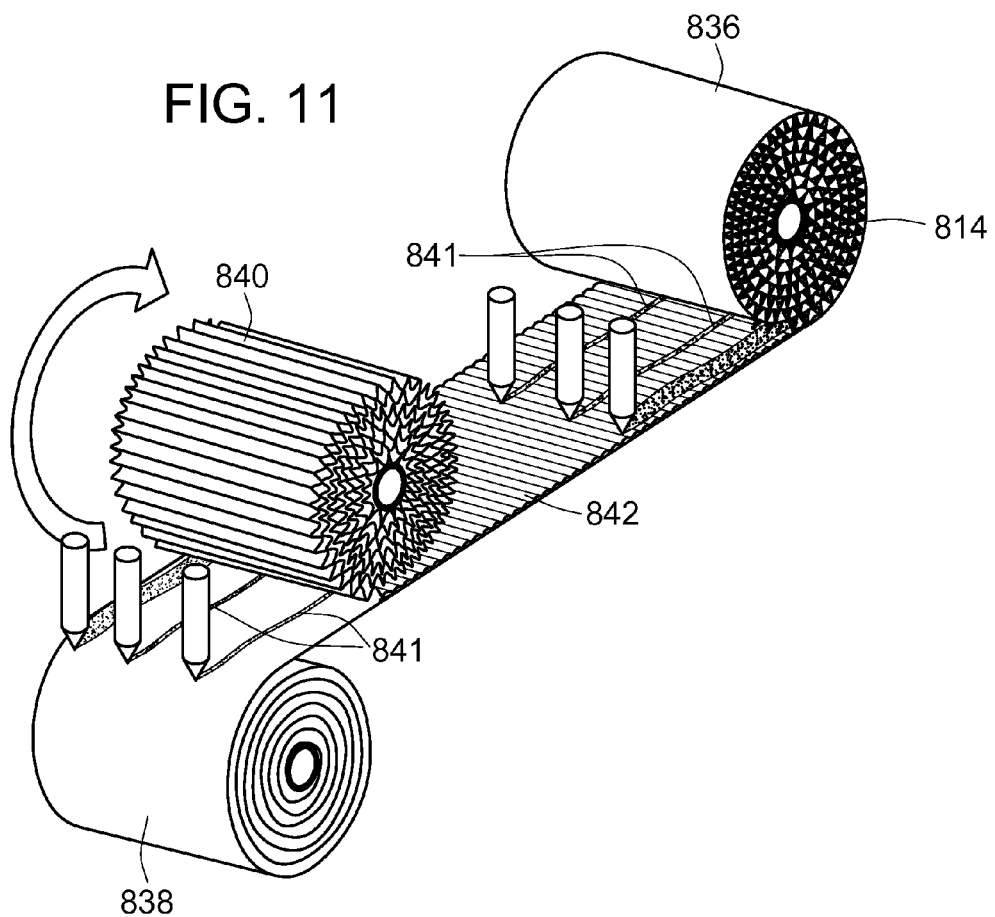
FIG. 11 is a perspective view showing details of forming an embodiment of a media pack for a filter element including the placement of adhesive beads on both sides of a corrugated sheet of filter media, as the media pack is being formed.

The filter element 804 includes a media pack 836. As illustrated in FIG. 11, the media pack 836 includes a plurality of coiled alternating layers of a face sheet material 838 and a convoluted filter material 840. The alternating layers form substantially longitudinally oriented flutes 842 extending to the outlet end 814 of the filter element 804 for passage of a fluid through the filter element 804.

In some embodiments of the invention, as illustrated in FIG. 11, alternating layers of the face sheet material 838 and the convoluted filter material 840 are secured to one another with adhesive beads 841 disposed on both sides of the layers of convoluted filter material 840, with the adhesive beads 841 being sized for securing the convoluted layers 840 to the adjacent layers of face sheet material 838 without blocking flow through the flutes 842. These adhesive beads 841 serve to more securely fasten adjacent alternating layers of the media pack 836 together, in a manner that provides additional resistance to telescoping of the alternating layers by axial forces on the media pack 836 resulting from fluid pressure.

Figure 12:
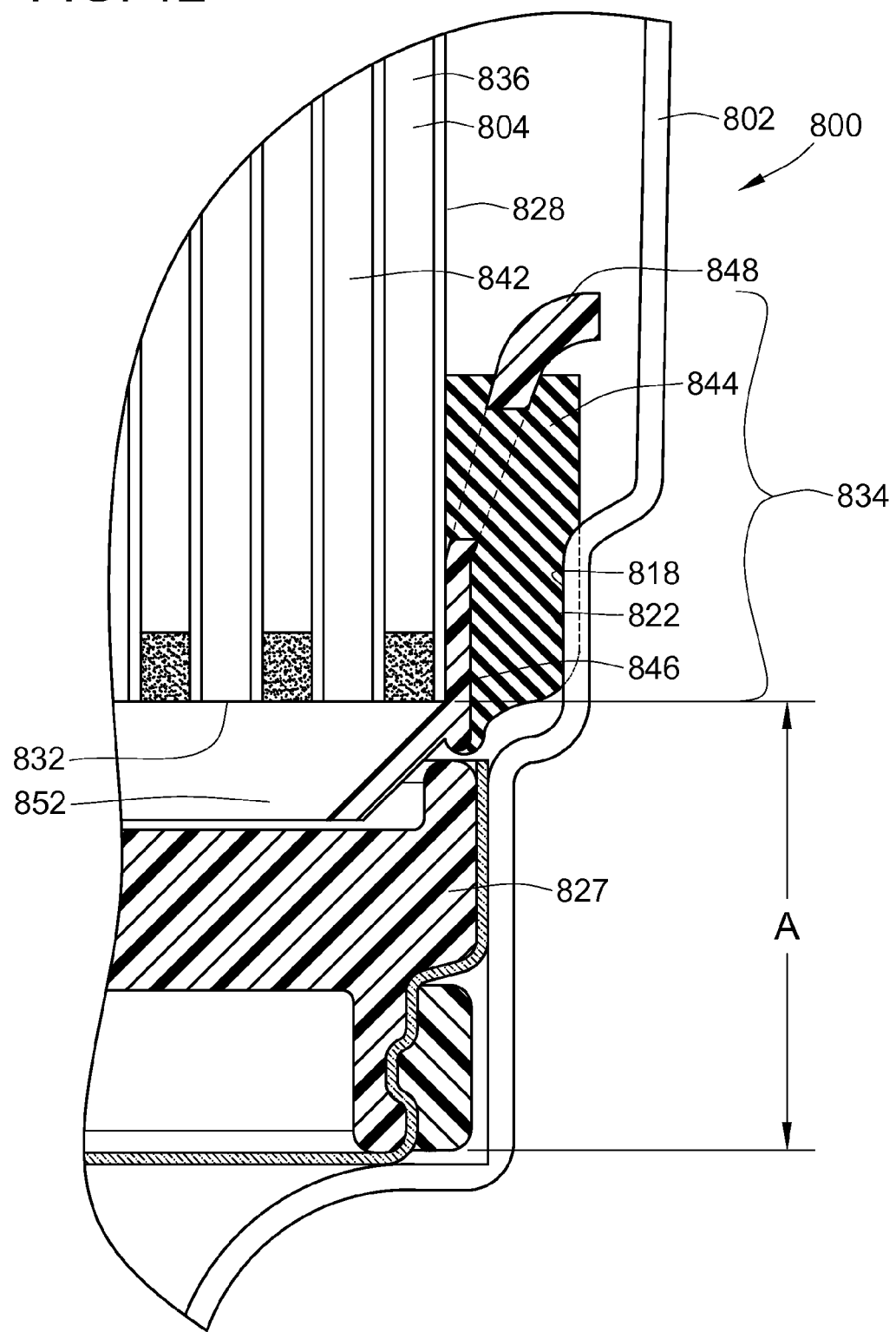
FIG. 12 is an enlarged partial cross-sectional view of a portion of the embodiment of the filter apparatus shown in FIG. 10, showing an embodiment of a seal and seal support ring

As shown in FIGS. 10 and 12, the filter element 804 also includes a radially acting seal 844, attached to the outlet end portion 834 of the outer periphery 828 of the filter element 804. As used herein, the term radially acting seal is intended to include seal configurations of various forms and materials that are compressible, deflectable, or otherwise configured to provide a radially acting sealing force against the inner surface 826 of the housing 802, when the filter element 804 is installed in the housing 802.

In the exemplary embodiment of the filter apparatus 800 shown in FIG. 10, the seal 844 is axially spaced from the outlet end 832 of the filter element 804 a distance such that the longitudinally oriented flutes 842 of the filter pack 804 extend axially along the seal 844, and at least partially along the second substantially radially inwardly facing surface 822 of the housing 802, when the seal 844 is acting against the second substantially radially inwardly facing surface 822. As shown in FIG. 13A, in other embodiments of the invention, the seal 844 may be positioned farther from the outlet end 832 of the filter element 804 and act radially against the first substantially radially inward oriented surface 820, so that the cross-sectional area of the media pack 836 can be increased to more closely match the second substantially radially inward facing surface 822 of the second section 818 of the housing 802.

As shown in FIG. 13B, in alternate embodiments of the invention where the filter element 804 is disposed at least partially within the third section 824 of the housing 802, the radially acting seal 844 may be attached to the outlet end portion 834 of the outer periphery 828 of the filter element 804 and axially spaced from the outlet end 832 of the filter element 804 a distance such that the longitudinally oriented flutes 842 of the media pack 836 extend axially along the seal 844 and at least partially along the third substantially radially inwardly facing surface 826 when the seal 844 is acting against one of the first or second substantially radially inwardly facing surfaces 820, 822 of the housing 802.

In any of the embodiments shown in FIGS. 10, 12, and 13A-13B, it will be seen that the axial distance 'A' between the primary and secondary filter elements 804, 827, in a filter apparatus according to an embodiment, is shorter than in the prior filter apparatus 710 shown in FIG. 9, and more completely filled with filter material. Reducing the distance 'A' between the primary and secondary filter elements thus leads to improved utilisation of the volume of the cavity 810 of the housing 802 in a filter apparatus according to an embodiment.

Figure 14:
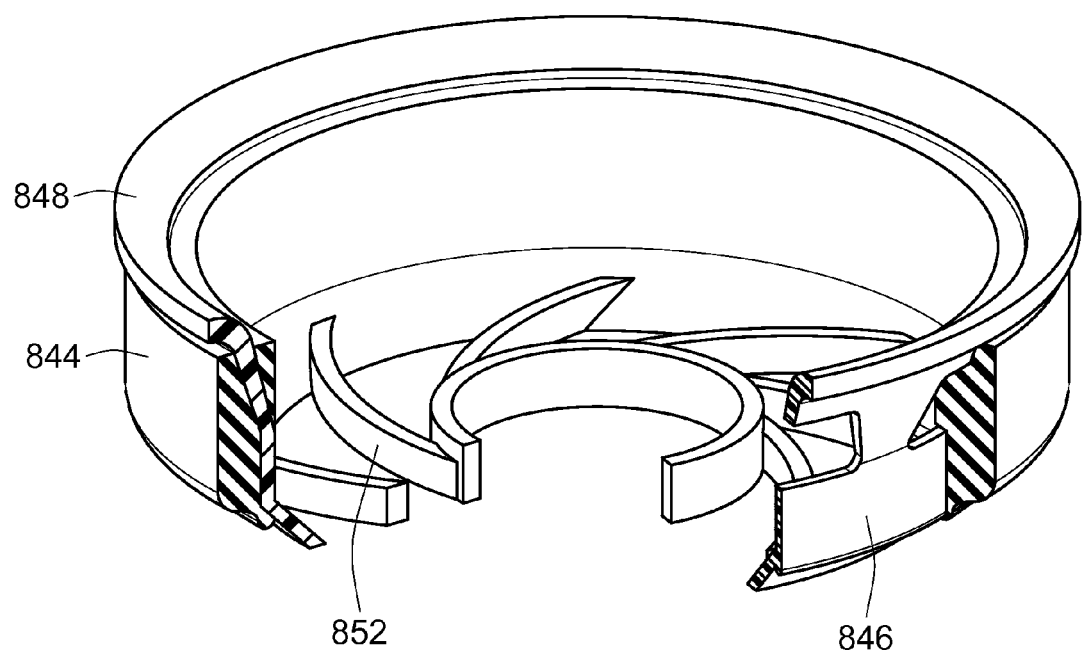
FIG. 14 is a perspective view showing details of a seal and seal support ring of the filter element shown in FIGS. 10 and 12.

The outlet end portion of a filter element, according to an embodiment may take a number of forms. In the exemplary embodiment of the filter element 804 shown in FIGS. 10, 12 and 14, for example, the seal 844 is attached to the body 846 of a seal support ring 848, which is in turn attached to the outer peripheral surface 828 of the media pack 836. Specifically, the seal support ring 848 of the filter element 804 of FIGS. 10, 12 and 14, is disposed about and attached to the media pack 836, and the seal 844 is attached to the seal support ring 848. As best seen in FIGS. 12 and 14, the seal support ring 848 includes a plurality of through-holes therein, and the seal 844 is molded onto the seal support ring 848, with portions of the seal 844 extending through the through-holes and bonding both the seal 844 and the seal support ring 848 to the media pack 836. It is contemplated that such a seal 844 might be molded from a polyurethane foam material, for example.

The seal support ring 848 of the embodiment shown in FIGS. 10, 12 and 14 also includes a plurality of struts 852 extending radially inward from the body 846 of the seal support ring 848, partially across the outlet end 832 of the media pack 836 of the filter element 804. These struts 852 provide resistance to fluid forces acting on the element 804, to preclude telescoping of the alternating layers in the media pack 836, in a manner that is more compact than the approach taken in the prior filter apparatus shown in FIG. 9. The struts 852 may be curved, and/or have their radial inner ends connected, in various embodiments.

Figure 15B:
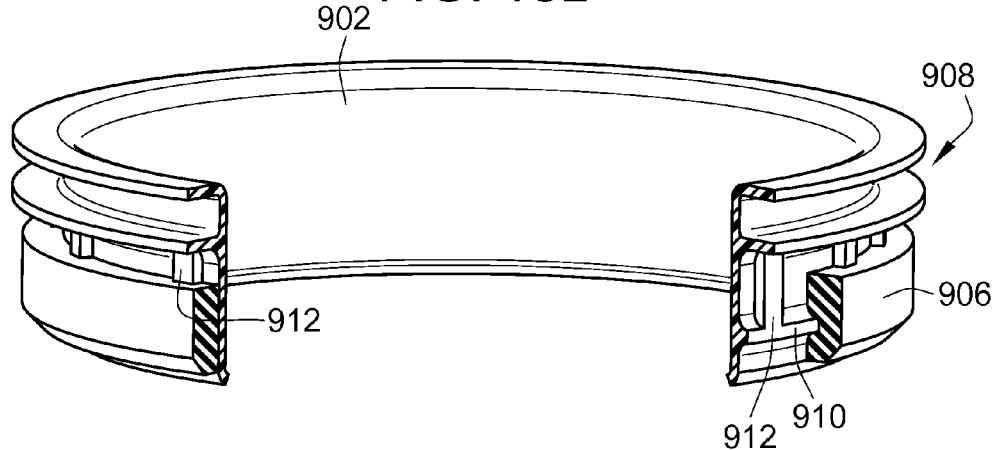
FIG. 15B is a perspective drawing showing details of the seal support ring of the embodiment shown in FIG. 15A.
Figure 15A:
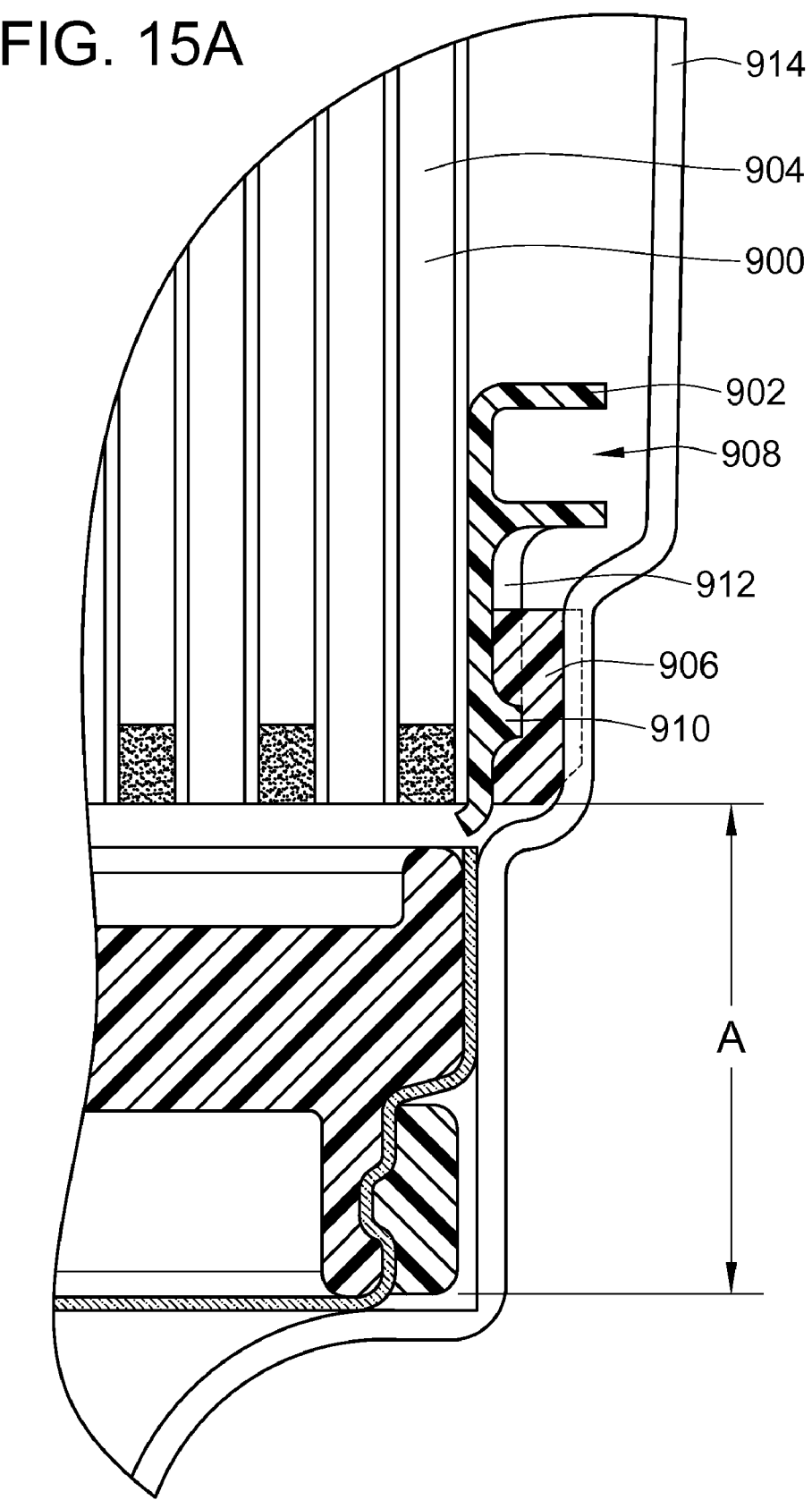
FIG. 15A is an enlarged cross-section of the same portion of the exemplary filter apparatus shown in FIG. 12, showing an alternate embodiment of a seal and seal support ring.

FIGS. 15A and 15B show an alternate embodiment of a seal support ring 902 of an alternate embodiment of a filter element 900. As shown in FIG. 15A, the seal support ring 902 is attached to a media pack 904, with a press fit or an adhesive, and a radially acting seal 906 is attached to the seal support ring 902 but not directly to the media pack 904. The seal support ring 902 includes a channel-shaped annular section 908, a radially extending annular flange 910, and a plurality of circumferentially spaced, axially-extending ribs 912, to provide rigidity in the seal support ring 902, and to support the seal 906 during installation and operation of the filter element 900 in a housing 914.

Figure 16:
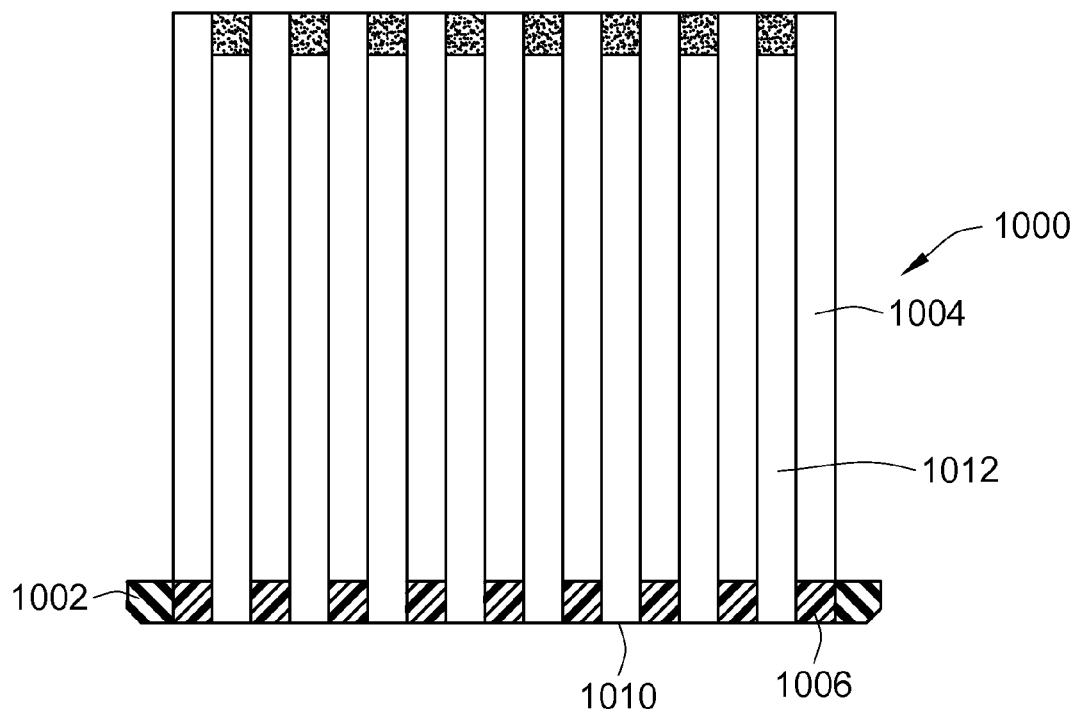
FIGS. 16 and 17 show alternate embodiments of a filter element including a rigid web formed internally to the outlet end of the filter element by a layer of resin.
Figure 17:
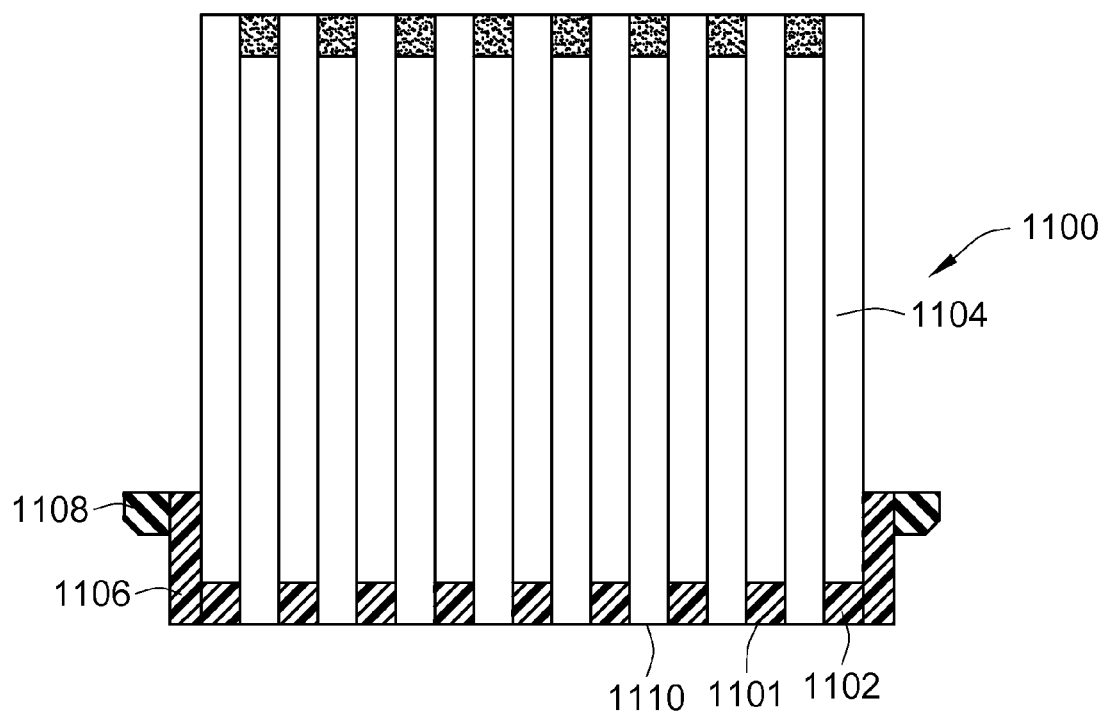

FIGS. 16 and 17 show alternate embodiments of filter elements 1000, 1100 in which the outlet end portion of the element includes a layer of resin extending axially a potted length into some of the flutes from the outlet end of the filter element, for providing resistance to telescoping of the alternating layers of the media pack, without having to resort to the use of struts or webs extending across the outlet end of the filter element. A wide range of resins can be used in practicing embodiments, including, but not limited to: thermoset and thermoplastic polymers, urethanes, epoxies, and ceramic filled polymers.

It is contemplated that such a layer of resin might be formed in accordance with the method disclosed in commonly assigned U.S. Pat. No. 6,743,317 to Wydeven, which is incorporated herein by reference. In addition to the method of Wydeven, embodiments contemplate attaching or forming the seal as part of the process of forming the layer of resin, in the manner taught by Wydeven.

In the filter element 1000 of FIG. 16, a radially acting seal 1002 is attached to the outer periphery of a media pack 1004 which includes a layer 1006 of resin at the outlet end 1010 of the filter element 1000. The seal 1002 is axially spaced from the outlet end 810 in such a manner that the longitudinally oriented flutes 1012 of the media pack 1004 extend at least along the seal 1002, as shown in FIG. 16, and alternatively extend axially beyond the seal 1002 to form an end configuration of the type illustrated in FIGS. 13A and 13B.

The layer 1006 of cured resin, in alternating closed ends of the flutes 1012 tends to partially impregnate the corrugated filter material and face sheets that form the flutes 1012, and forms a rigid web within the outlet end 1010 of the filter element 1000. This rigid web provides radial support for the outlet end 1010 to react radially and axially directed forces that are imposed on the media pack 1004 by the radially acting seal 1002, during installation and operation of the filter element 1000. The rigid web also resists telescoping of the alternating layers of the media pack 1004 under axially directed fluid pressure, without the need, in some embodiments, for additional webs, struts or ribs extending across the outlet end 1010 external to the media pack 1004. Where such external structures can be eliminated or reduced in size, through use of an internally located rigid web formed by the layer 1006 of resin, the distance 'A' between a primary and a secondary filter element can be reduced and the media pack extended so that the filtering capacity of the filter element 1000 is increased.

In the filter element 1100 of FIG. 17, in addition to forming a rigid web 1102 within the outlet end of the media pack 1104, a layer 1101 of cured resin extends axially along the outer periphery of the media pack 1104 to at least partially form a seal support ring 1106. A seal 1108 is attached to the seal support ring 1106. Having the layer 1101 of resin at least partially form the seal support ring 1106 integrally joins the seal support ring 1106 to the rigid web 1102 of cured resin within the outlet end 1108 of the media pack 1102, so that the outlet end portion 1110 of the filter element 1100 can be made more structurally robust than the embodiment of filter element 1000 shown in FIG. 16.

Figure 18:
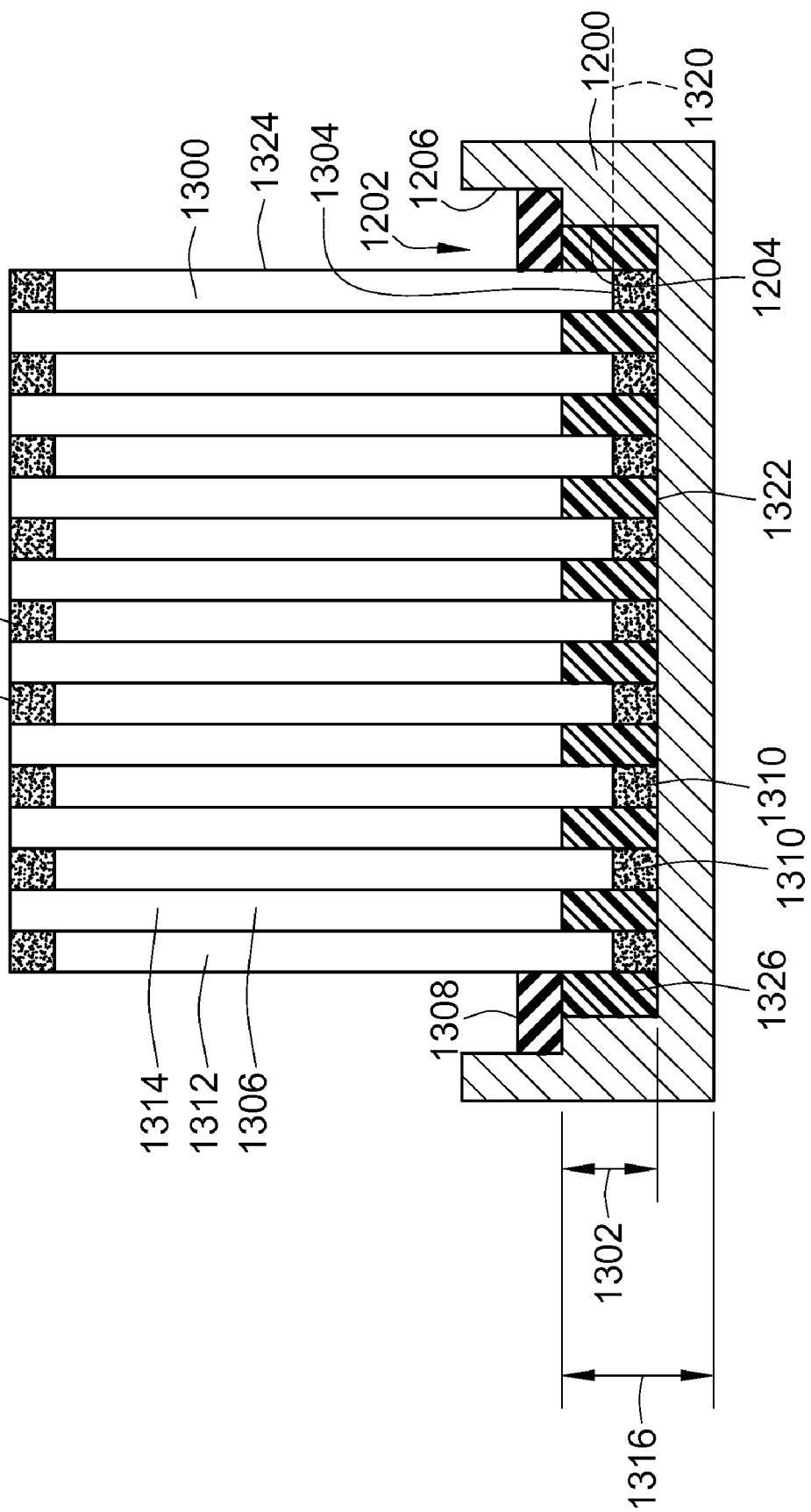
FIG. 18 shows a mold used for forming a rigid web of the type shown in FIGS. 16 and 17, and attaching a seal to a filter element including a layer of resin forming the rigid web.

FIG. 18 illustrates a mold 1200 which can be used for forming a filter element 1300, according to an embodiment, having a resin layer 1302 at the outlet 1304 of a filter media pack 1306 and a seal 1308 attached to the resin layer 1302. To perform such a process for manufacturing a filter element, the filter media pack 1306 is formed from a flat face sheet of filter material and a convoluted sheet of filter material, positioned one on top of the other in alternating layers to form longitudinally extending flutes 1312, 1314 in the media pack 1306. The flat sheet and the convoluted sheet are substantially of the same length and width and are bonded to each other by using a sealing composition in a pre-determined, relatively narrow area on or near opposing sides such that the sealing composition forms plugs 1310 on either side, which define confined flutes 1312 between the convoluted sheet and the face sheet.

A predetermined length of the filter media is assembled such that a series of flutes 1312 which are plugged on both sides, and a series of unplugged flutes 1314, are formed. The filter pack 1306 is vertically positioned so that the plugs 1310 on one side of the confined flutes 1312 face downward, as shown in FIG. 18, into a receptacle 1202 of the mold 1200, which contains an amount of sealant resin having a sufficient height for filling the unplugged flutes 1314 to a potted length 1316 higher than the top edges of the downwardly facing plugs 1310 in the confined flutes 1312.

The lower end of the media pack 1306 is inserted into the receptacle 1202 to a sufficient depth to fill a portion of each of the unplugged flutes 1314 to the potted length 1316. Without removing the media pack 1306 from the receptacle 1202, the seal 1302 is attached to the layer 1302 of sealant resin, and then the media pack 1306 is cut, as indicated at dashed line 1320 so that the cut is above the downwardly facing plug 1310 for each of the confined flutes 1314 but below the top surface of the cured sealant which filled a portion of each of the unplugged flutes 1312, thereby forming the completed filter element 1300. The filter completed filter element 1300 includes a series of flutes 1312 which are plugged on only one side, a series of flutes 1314 plugged on only the opposite side, and a seal 1308, with the layer of resin 1316 in the flutes 1314 forming a structural web at one end 1322.

The seal 1308 can be attached to the layer of resin by a number of methods, either prior to, or after the media pack 1306 is removed from the mold 1200, and prior to, or after the lower end is cut off of the media pack 1306. For example, a pre-formed seal 1308 may be attached with an adhesive, before or after the media pack 1306 is removed from the mold. The seal 1308 may alternatively be formed in-situ onto the media pack 1306.

Where it is desired to form the seal 1308 in-situ, the receptacle 1202 in the mold 1200 defines a first cavity 1204 thereof, for containing the resin sealant, and a second cavity 1206 thereof, for receiving a seal material in an uncured state. The method further includes forming the seal 1308 by placing a sufficient volume of the seal material in the uncured state in to the second cavity 1206, and allowing the seal material to cure, before removing the filter media pack 1306 with attached seal 1308 from the receptacle 1202. This method results in the seal 1308 being structurally attached directly to a portion of the layer of resin 1316 extending around the outer periphery 1324 to form a seal support ring 1326, as shown in FIG. 18. In other embodiments, where a first receptacle in a mold fits so tightly around the outer periphery of a filter media pack that no seal support ring is formed, one embodiment of a method according to the invention, results in the seal being indirectly connected to the resin layer through the outer layers of the media pack, which are partially impregnated with the resin during the process of fabricating the resin layer.

Where it is desired to have the layer of resin 1302 include a seal support ring 1326 that extends axially beyond the potted length 1316, additional sealant resin is added into the receptacle of a mold, essentially as described above, prior to attaching or forming the seal, to form an elongated seal support ring extending from the layer of sealant and having an axial length greater than the filled portion of each of the unplugged flutes 1314. The seal 1308 is attached to, or formed in-situ upon, the seal support ring 1326 of the layer 1302 of sealant. Where it is desired to have a seal attached to a radially outer surface of a seal support ring, extended or otherwise, a two piece mold, or a multi-step process may be utilized for forming the seal.

In some embodiments including a resin layer, the methods described above may also include securing alternating the layers of face sheet material and convoluted filter material to one another with adhesive beads disposed on both sides of the layers of convoluted filter material, as described above in relation to FIG. 11, with the adhesive beads being sized for securing the convoluted layers to the adjacent layers of face sheet material without blocking flow through the flutes. The adhesive beads work in conjunction with the rigid resin layer to more securely fasten adjacent alternating layers of the media pack together in a manner that provides additional resistance to telescoping of the alternating layers by axial forces on the media pack resulting from fluid pressure.

Those having skill in the art will recognize that, although the preceding disclosure has focused primarily on filter apparatuses and filter elements having generally right-circular cylindrical shapes, embodiments of the invention may also be practiced in filter apparatuses and with filter elements having other cross-sectional shapes. For example, FIGS. 19 and 20 illustrate alternate exemplary embodiments in the form of filter elements having oblong, or race-track shaped cross-sections.

Figure 19:
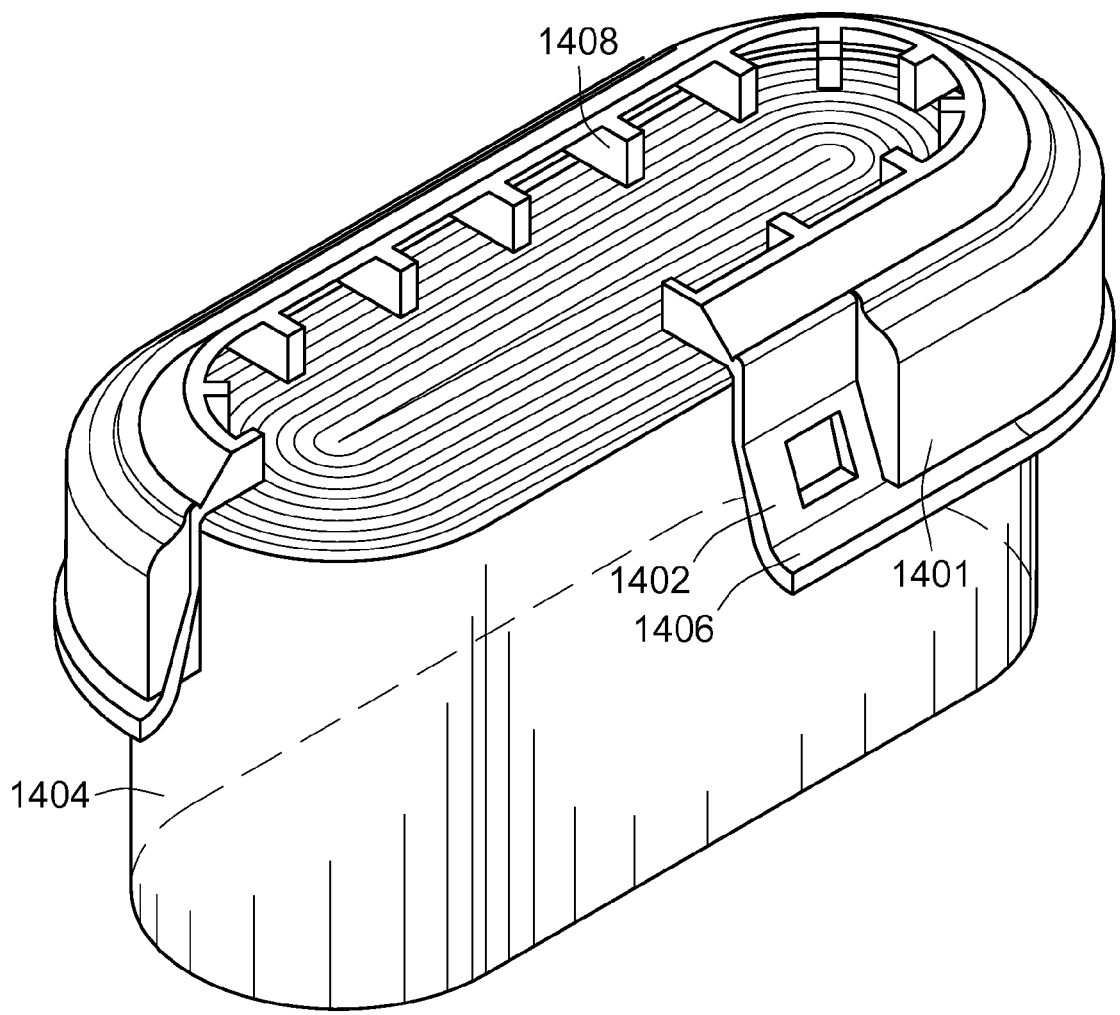
FIG. 19 is a perspective view of an oblong, or race-track shaped filter element, including a seal support ring of the type shown in FIGS. 10, 12, and 14.

In the exemplary embodiment of the filter element shown in FIG. 19, a seal 1401 is attached to the body of a seal support ring 1402, which is in turn attached to the outer peripheral surface of a race-track shaped media pack 1404. The seal support ring 1402 includes a skirt-like outwardly extending flange 1406, which provides significant support and rigidity to the seal support ring 1402, particularly in the straight-sided wall portions of the seal support ring 1402. Those having skill in the art will recognize that the outwardly extending flange 1406 of the seal ring 1402 allows various embodiments to withstand forces incident in service, without having to resort to the ribs extending completely across the axial end of the media pack 1404 that were required in prior filter elements. The embodiment shown in FIG. 19 does include a plurality of struts 1408 extending radially inward from the body of the seal support ring 1402, partially across the outlet end of the media pack 1404 of the filter element. These struts 1408 provide resistance to fluid forces acting on the element, to preclude telescoping of the alternating layers of the media pack 1404, in a manner that is more compact than the approach taken in the prior filter apparatus shown in FIG. 9. The struts 1408 may be curved, and/or have their radial inner ends connected, in various embodiments. In some embodiments, however, the outwardly extending flange 1406 provides sufficient stiffness under operating conditions that the struts 1408 may be partially or totally eliminated from the seal support ring 1402.

Figure 20:
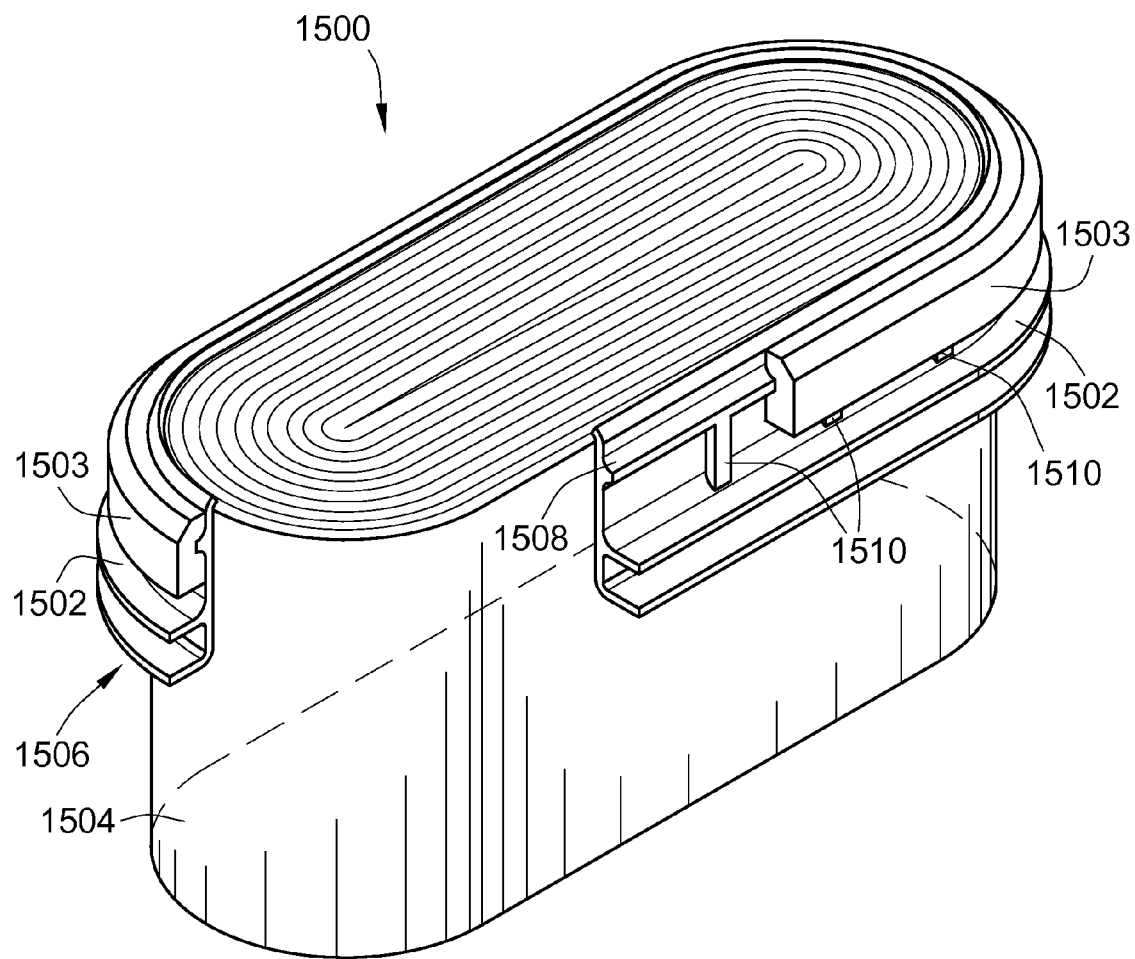
FIG. 20 is a perspective view of an alternate embodiment of an oblong, or race-track shaped filter element including a seal support ring of the type shown in FIGS. 15A and 15B.

In the embodiment of the filter element 1500, shown in FIG. 20, a seal support ring 1502 is attached to a race-track shaped media pack 1504, with a press fit, or an adhesive, and a radially acting seal 1503 is attached to the seal support ring 1502 but not directly to the media pack 1504. The seal support ring 1502 includes a channel-shaped annular section 1506, a radially extending annular flange to 1508, and a plurality of circumferentially spaced, axially-extending ribs 1510, to provide rigidity in the seal support ring 1502, and to support the seal 1503 during installation and operation of the filter element 1500 in a housing. As was the case with the embodiment of the filter element shown in FIG. 19, the channel-shaped annular section 1506, the radially extending annular flange 1508, and the porality of circumferentially spaced, axially-extending ribs 1510 provide sufficient rigidity in some embodiments, that the support webs and frames extending across the outlet of the filter element which were required in prior filter elements can be eliminated in a filter element according to other embodiments of the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter apparatus comprising:
   a filter housing and a filter element disposed in the filter housing;
   the filter housing defining a longitudinal axis of the filter apparatus and having an inner surface defining a cavity extending along the axis and having a housing inlet at one axial end of the cavity and a housing outlet at an opposite axial end of the cavity;
   the inner surface of the filter housing including at least first and second sections thereof, with the first section extending axially from the inlet and defining a first substantially radially inwardly facing surface, and the second section being axially disposed between the first section and the outlet, the second section protruding radially inward beyond the first section and defining a second substantially radially inward facing surface;
   the filter element defining an outer peripheral surface thereof extending axially from an inlet end to an outlet end of the filter element, and an outlet end portion of the filter element disposed at least partially within the second section;
   the filter element including a media pack having a plurality of alternating layers of a face sheet material and a convoluted filter material, with the alternating layers forming substantially longitudinally oriented flutes extending to the outlet end of the filter element for passage of a fluid through the filter element;
   the filter element also including a radially acting seal attached to the outlet end portion of the filter element and axially spaced from the outlet end of the filter element a distance such that the longitudinally oriented flutes of the filter pack extend axially along the seal and at least partially along the second substantially radially inwardly facing surface of the housing when the seal is acting against one of the first or second substantially radially inwardly facing surfaces.

2. The filter apparatus of claim 1, wherein the seal is axially spaced from the outlet end of the media pack such that the longitudinally oriented flutes of the filter element extend axially beyond the seal between the seal and the outlet of the media pack.

3. The filter apparatus of claim 1, wherein the seal acts against the first substantially radially inwardly facing surface of the housing.

4. The filter apparatus of claim 1, wherein the second substantially radially inwardly facing surface of the housing defines an axial length of the second section of the inner wall of the housing, and the outlet end portion extends substantially completely along the axial length of the second section of the housing.

5. The filter element of claim 4, wherein the seal acts against the first substantially radially inwardly facing surface.

6. The filter apparatus of claim 1, wherein:
   the inner surface of the filter housing further includes a third section thereof disposed axially between the housing outlet and the second section of the inner surface of the filter housing, with the third section defining a third substantially radially inwardly facing surface;
   the outlet end portion of the filter element is disposed at least partially within the third substantially inwardly facing surface; and
   the radially compressible seal is attached to the outlet end portion of the filter element and is axially spaced from the outlet end of the filter element a distance such that the longitudinally oriented flutes of the filter pack extend axially along the seal and at least partially along the third substantially radially inwardly facing surface when the seal is acting against one of the first or second substantially radially inwardly facing surfaces.

7. The filter apparatus of claim 6, wherein the seal of the filter element acts against the first substantially radially inwardly facing surface of the housing.

8. The filter apparatus of claim 7, wherein the third section of the inner wall of the housing defines an axial length thereof, and the filter apparatus further comprises a secondary filter element disposed in the third section and having an axial length of the secondary filter that does not extend axially beyond the axial length of the third section of the inner wall of the housing.

9. The filter apparatus of claim 1, wherein the outlet portion of the filter element includes a layer of resin extending axially a potted length into some of the flutes from the outlet end of the filter element.

10. The filter apparatus of claim 9, wherein the layer of resin also includes a ring thereof forming part of the outlet end portion of the filter element, and the seal is attached to the ring of the layer of resin.

11. The filter apparatus of claim 1, wherein the outlet end portion of the filter element includes a seal support ring disposed about and attached to the media pack, and the seal is attached to the seal support ring.

12. The filter apparatus of claim 11, wherein the outlet end portion of the filter element includes a layer of resin extending axially a potted length into some of the flutes from the outlet end of the filter element.

13. The filter apparatus of claim 12, wherein the layer of resin also includes the seal support ring.

14. The filter apparatus of claim 13, wherein the support ring extends axially from the outlet end of the filter element a distance greater than the potted length.

15. The filter apparatus of claim 11, wherein:
the seal support ring includes a plurality of through holes therein; and
the seal is molded onto the seal support ring with portions of the seal extending through the through holes and bonding the seal and seal support ring to the media pack.

16. The filter apparatus of claim 11, wherein the seal support ring includes a plurality of struts extending partially across the outlet end of the filter element.

17. A filter apparatus, comprising
a filter housing and a filter element disposed in the filter housing;
the filter housing defining a longitudinal axis of the filter apparatus and having an inner surface defining a cavity extending along the axis and having a housing inlet at one axial end of the cavity and a housing outlet at an opposite axial end of the cavity;
a housing sealing surface being provided by the filter housing;
the filter element comprising a media pack, a seal support ring, and a seal;
the media pack having a plurality of alternating layers of a face sheet material and a convoluted filter material, with the alternating layers forming flutes extending generally between an inlet end and an outlet end of the filter element for passage of a fluid through the filter element and the housing from the housing inlet to the housing outlet, the media pack having an outer periphery extending between the inlet end and the outlet end;
the seal support ring including a body thereof disposed radially about the outer periphery of the media pack, the ring extending only over part of the outer periphery of the media pack; and
the seal formed of seal material, the seal material integrally attached to the media pack and to the seal support ring in a manner to sealingly attach the seal support ring to the media pack at a first seal interface; the seal material forming an element seal surface sealing against the housing sealing surface to provide a second seal interface to prevent short circuiting of fluid from the housing inlet to the housing outlet.

18. The filter apparatus of claim 17, wherein the seal is a radial seal in which the second seal interface is radial engagement between the element sealing surface and the housing seal surface.

19. The filter apparatus of claim 18, wherein the element seal surface is axially between the inlet and outlet ends, and wherein the seal material is integrally attached to the media pack around the outer periphery of the media pack.

20. The filter apparatus of claim 17, wherein:
the seal support ring includes a plurality of through holes therein; and
the seal is molded onto the seal support ring with portions of the seal extending through the through holes and bonding the seal and seal support ring to the media pack.

21. The filter apparatus of claim 17, further comprising a seal support frame including the seal support ring, wherein the seal support frame is formed of plastic material and further includes a grid projecting over the one end of the filter media pack.

22. The filter apparatus of claim 17, wherein the seal material is molded polyurethane.

* * * * *